(12) United States Patent
Tomalia et al.

(10) Patent No.: US 6,995,234 B2
(45) Date of Patent: Feb. 7, 2006

(54) NANOCOMPOSITES OF DENDRITIC POLYMERS

(75) Inventors: Donald A. Tomalia, Midland, MI (US); Lajos Balogh, Midland, MI (US)

(73) Assignee: The Dow Chemical Company, Midland, MI (US)

(*) Notice: Subject to any disclaimer, the term of this patent is extended or adjusted under 35 U.S.C. 154(b) by 11 days.

(21) Appl. No.: 10/682,646

(22) Filed: Oct. 9, 2003

(65) Prior Publication Data

US 2004/0070094 A1   Apr. 15, 2004

Related U.S. Application Data

(62) Division of application No. 09/780,973, filed on Feb. 10, 2001, now Pat. No. 6,664,315, which is a division of application No. 08/924,790, filed on Sep. 5, 1997, now abandoned.

(51) Int. Cl.
*C08K 3/00* (2006.01)
*C08J 9/00* (2006.01)

(52) U.S. Cl. .............. 528/490; 528/487; 528/489; 523/105; 523/205; 523/218; 524/504; 424/486; 424/501

(58) Field of Classification Search ............ 523/218, 523/105, 205; 524/504; 424/486, 501; 528/490
See application file for complete search history.

(56) References Cited

U.S. PATENT DOCUMENTS

| 4,587,329 | A | | 5/1986 | Tomalia et al. ............ 528/363 |
| 5,338,532 | A | | 8/1994 | Tomalia et al. ............ 424/1.49 |
| 5,376,690 | A | | 12/1994 | Newkome et al. .......... 521/53 |
| 5,422,379 | A | | 6/1995 | Newkome et al. .......... 521/53 |
| 5,938,934 | A | * | 8/1999 | Balogh et al. ............ 210/688 |
| 6,664,315 | B2 | * | 12/2003 | Tomalia et al. ........... 523/218 |

FOREIGN PATENT DOCUMENTS

EP    0 684 044    11/1995

OTHER PUBLICATIONS

Balogh, Lajos et al. "A revolution of nanoscale proportions", American Chemical Society, Chemical nnovation Mar. 2000, pp. 19-26.

Grohn, Franziska et al. "Dendrimer Templates for the Formation of Gold Nanoclusters", Macromolecules 2000, vol. 33, pp. 6042-6050.

* cited by examiner

*Primary Examiner*—Tae H. Yoon
(74) *Attorney, Agent, or Firm*—Sughrue Mion, PLLC

(57) ABSTRACT

In the present invention, an inorganic reactant is, or reactants are, localized with respect to a dendritic polymer by physical constraint within or by a non-covalent conjugation to the dendritic polymer. The localized inorganic reactant or reactants is/are subsequently transformed to form a reaction product which is immobilized with respect to the dendritic polymer. This immobilization occurs on a nanoscopic scale as a consequence of the combined effects of structural, chemical and physical changes without having covalent bonds between the product(s) and the dendritic container and results in new compositions of matter called dendritic nanocomposites. The resulting nanocomposite material can be used to produce revolutionary products such as water soluble elemental metals, with specific applications including magnetic resonance imaging, catalytic, magnetic, optical, photolytic and electroactive applications.

15 Claims, 16 Drawing Sheets

50 nm

NANOCOMPOSITES OF DENDRITIC POLYMERS

RELATED APPLICATIONS

This invention is a divisional of U.S. application Ser. No. 09/780,973, filed Feb. 10, 2001, now granted as U.S. Pat. No. 6,664,315, which was a divisional of U.S. application Ser. No. 08/924,790, filed Sep. 5, 1997 now abandoned.

FIELD OF THE INVENTION

This invention relates to the formation of novel nanocomposites between dendritic polymers and a variety of materials.

BACKGROUND OF THE INVENTION

The literature describes the formation of nanoparticles in various classical polymers, such as organization and immobilization of metal compounds in linear, branched and crosslinked polymers. In particular, the literature describes immobilization of metals, metal ions, and metal sulfides using ionomers, and block copolymers.

Rules of complex formation are well known in physical chemistry as a consequence of more than fifty years of extensive research. Formation of such complexes may occur on the surface of dendritic polymers or in their interior. These phenomena have been described in many publications.

Preparation and analysis, physics and chemistry of nanosized materials is described for instance in the series of books of Kluver Academics On The Physics and Chemistry Of Materials With Low-Dimension Structures, such as "Physics and Chemistry Of Metal Cluster Compounds" edited by L. J. De Jongh, Kluver Academic, Dordrecht/Boston/London, 1994, and references thereof. A general drawback of the presently used methods of preparing nanosized materials is that they either require sophisticated and expensive instrumentation or tedious and extensive preparation and purification processes. Simple preparation of transiently stabilized nanosized materials in solution is possible by employing a combination of small organic ligands and amphophilic molecules. However, these clusters lack long-term stability. Also, a general disadvantage with known methods of preparing nanosized materials is that the size and size distribution of the resulting nanoparticles obey statistical rules. As a result, preparation of nanoparticles with a narrow size distribution requires tedious purification procedures.

J. U. Yue et al. have reported, in *J. Am. Chem. Soc.* 1993, 115, 4409–4410, a technique for preparing nanosized materials involving synthesis of zinc fluoride in poly(2,3-trans-bis-tert-butylanildimethyl-norborn-5-ene) domains within polymethyltetracyclododecene matrices, and interconversion of the zinc fluoride clusters to zinc sulfide. Yue et al. concluded that the disclosed method demonstrated a general approach for carrying out a chemical reaction within a nanoscale region of a block copolymer, and speculated that different kinds of clusters can be synthesized from a given starting material. Yue et al. hypothesized that lead sulfide and cadmium sulfide clusters can be prepared using the general approach disclosed, and reported that this same approach has been used to generate zinc sulfide quantum clusters which are superior in quality to zinc sulfide clusters generated using other techniques.

Martin Moller reported in *Synthetic Metals*, 1991, 41–43, 1159–1162, the synthesis of nanosized inorganic crystallites or clusters of cadmium sulfide, cobalt sulfide, nickel sulfide and zinc sulfide prepared from functionalized diblock copolymers of polystyrene and poly-2-vinylpyridine. The diblock copolymers were prepared with narrow molecular weight distributions by sequential anionic polymerization. Films were prepared by solvent evaporation with metal salts of copper, cadmium, cobalt, nickel, zinc and silver. The films were subsequently treated with gaseous hydrogen sulfide to form the corresponding metal sulfides.

W. Mahler, in *Inorganic Chemistry*, 1988, 27(3), 435–436, reported the preparation of polymer-trapped semiconductor particles by milling an ethylene-methacrylic acid copolymer with a metal acetate or acetylacetonate at an elevated temperature (160° C.) to form a neutralized ionomer.

T. Douglas et al. have reported in *Science, Jul.* 7, 1995 Vol. 269, 54–57, the synthesis of amorphous iron sulfide minerals containing either 500 or 3000 iron atoms in each cluster. The synthesis was achieved within the nanodimensional cavity of horse spleen ferritin. The report indicates that the reaction of acidic (pH 5.4) sulfide solutions within ferritin results in the in situ nanoscale synthesis of protein encapsulated iron sulfides. Douglas et al. speculated that such bioinorganic nanoparticles might be useful as biological sensors and markers, drug carriers, and diagnostic and radioactive agents. More specifically, magnetoferritin has shown potential as a contrast agent for magnetic resonance imaging of tissue and uranium oxide-loaded ferritin could have use in neutron-capture therapy. Douglas et al. have also suggested that nanodimensional metal sulfides could be useful in the preparation of semiconductors which could be of technological, and perhaps biological importance.

Y. Wang et al. have reported in *J. Chem. Phys.*, 1987 87(12), 7315–7322, December 15, the preparation of nanodimensional lead sulfide clusters in ethylene-methacrylic acid copolymers by exchanging $Pb^{2+}$ into the polymer film and then reacting the resulting lead-resin complex with hydrogen sulfide.

J. P. Kuczynski et al. have reported in *J. Phys. Chem.*, 1984, 88, 980–984, the synthesis of cadmium sulfide in a Nafion polymer film. Small cadmium sulfide crystalline particles were reported to exhibit properties similar to those of cadmium sulfide single crystals.

M. Krishnan et al. have reported in *J. Am. Chem. Soc.*, 1983, 105, No. 23, 7002–7003, a method of incorporating a dispersed semiconductor (CdS) throughout an ionically conductive polymer membrane (Nafion), in which a suitable redox couple and catalyst can be added to promote photocatalytic reactions on the membranes. The pre-treated membrane was immersed in a solution of $Cd^{2+}$ (pH=1) to incorporate $Cd^{2+}$ in the membrane by ion exchange. Subsequent exposure of the membrane to hydrogen sulfide produced spherical cadmium sulfide particles of a diameter of one micrometer or smaller. A cationic redox agent, such as methylviologen ($MV^{2+}$), can be incorporated into the membrane. Kishnan et al. also reported that platinum can be incorporated into the $CdS/MV^{2+}$ membrane system, and have speculated that by employing an analogous technique, incorporation of other semiconductors, such as titanium oxide and zinc sulfide, should be possible.

Albert W-H Mau et al. have reported in *J. Am. Chem. Soc.*, 1984, 106, No. 22, 6335–6542, that hydrogen-production efficiencies from water in photocatalytic reactions at cadmium sulfide crystallites embedded in a polymer (Nafion) matrix containing a hydrogen evolution catalyst (Pt) were greater than those observed with unsupported colloidal or powdered semiconductors under similar conditions.

Y. Ng Cheong Chan et al. have reported, in *Chem. Mater.* 1992, 4, 885–894, methods for forming metal clusters that are less than 100 Angstroms in diameter, that have a narrow size distribution, and that are dispersed evenly throughout a nonconductive polymer matrix. These methods involve reduction of metal complexes and aggregation of metal atoms in the solid state, either in an organometallic homopolymer or in an organometallic block of a microphase-separated diblock copolymer. Chan et al. suggest that such compositions might exhibit discernable catalytic properties.

In *J. Am. Chem Soc.* 1992, 114, 7295–7296, Chan et al. reported the synthesis of single silver nanoclusters evenly dispersed within spherical microdomains of block copolymer films.

Sung Soon Im et al. reported, in *J. Appl. Polym. Sci.,* 1992, 45, 827–836, the preparation of metallic sulfide and polyacrylonitril (PAN) film composites which exhibit improved electrical conductivity. The composites were prepared by a chelating method in which PAN films were treated with ammonium hydroxide solution to induce amidoxime groups which were coordinated with $Cu^{2+}$ and $Cd^{2+}$ absorbed to the amidoximated PAN films and subsequently treated with hydrogen sulfide gas to form CuS-PAN and CdS-PAN composite films.

M. Francesca Ottaviani et al. reported in *J. Am. Chem. Soc.* 1994, 116, 661–671, the preparation and characterization of $Cu^{2+}$ complexes formed with anionic polyamidoamine (PAMAM) Starburst® dendrimers (SBDs). The PAMAM SBDs (generations 0.5–7.5) were subjected to hydrolysis of methyl ester-terminated generations with stoichiometric amounts of sodium hydroxide in methanol to form sodium carboxylate terminated PAMAM SBDs. The carboxylated PAMAM SBDs were treated with aqueous $Cu(NO_3)_2$ solutions to obtain SBD/Cu(II) complexes. Ottaviani et al. identified three different complexes of copper using electron paramagnetic resonance technique, including carboxylate complexes at low pH, $Cu(II)-N_2O_2$ complexes involving interactions with nitrogen centers in the internal permeable structure of the dendrimers at intermediate pH, and $Cu(II)-N^3O$ or $Cu(II)-N^4$ complexes involving a wide number of internal sites at both higher pH and higher generation.

In *J. Phys. Chem.* 1996, 100, 11033–11042, Ottaviani et al. disclosed the preparation and characterization of PAMAM-SBDs/Mn(II) complexes. Ottaviani et al. concluded that Mn(II) does not interact with amino-terminated full generation PAMAM-SBDs, and only interacts probably at the second solvation shell, with surface carboxylate groups of carboxylated half generation PAMAM-SBDs.

In *J. Phys. Chem. B.,* 1997, 101, 158–166, Ottaviani et al. disclosed the preparation and characterization of PAMAM-SBDs/Cu(II) complexes. Ottaviani et al. concluded that Cu(II) does interact with amino-terminated full generation PAMAM-SBDs as a function of pH. Three different complexes were found in the amino-terminated PAMAM-SBDs, including $Cu(II)-N_2O_2$ complexes involving interactions with nitrogen centers in the internal permeable structure of the dendrimers at intermediate pH, $Cu(II)-N_3O$ complexes and $Cu(II)-N_4$ complexes.

In *Polym. Prepr., ACS Div. Polym. Chem.* 1995, 36, 239–240 Wege et al. reported the formation of polymer hybrids when methyl acrylate and vinyl acetate polymerization was initiated by radical initiators in the presence of PAMAM dendrimers. Depending on reaction conditions, both water soluble and insoluble hybrids formed. The drawback of such a process is, that the method is limited to radically polymerizable organic monomers, and, the reaction results in inseparable polymeric hybrid networks because of the chain-transfer to dendrimer that results in covalent bonds between the growing polymeric chain and the functional groups of the host, thereby irreversibly eliminating the container-properties of the dendrimers used.

In *Eur. Pat. Appl.* 95201373.8 (Publ. 0,684,044 A2), Meijer et al. disclosed a composition consisting of a dendrimer and an active substance. This composition is formed by mixing a dendrimer with a previously synthesized compound and treating the surface of the dendrimer with a blocking agent which is sterically of sufficient size, which readily enters into a chemical bond with the terminal groups of a dendrimer, and which can also be split off from the dendrimer thereby controlling the release of partly or fully occluded compounds. The drawback of such a process is that it is limited to the inclusion of pre-existing compounds. Another drawback is, that the method is limited to dendrimers having identical and modifiable surface groups.

In U.S. Pat. No. 5,422,379, Newkome et al. disclose the construction of unimolecular micelles that are able to reversibly expand and contract as a response to a change in the environment. These unimolecular micelles may have different structures and active reaction sites which may complex metals.

SUMMARY OF THE INVENTION

The invention includes a variety of composite compositions of matter in which discrete nanosized inorganic materials are distributed on or in a polymeric material, and in which the size and size-distribution of the distributed nanosized inorganic materials are determined and controlled by a dendritic polymer. The invention also contemplates various methods of forming composite compositions of matter in which discrete nanosized inorganic materials are distributed on or are in a polymeric material, and in which the size and size-distribution of the distributed nanosized inorganic materials are determined and controlled by a dendritic polymer.

The methods generally include a first step involving a non-covalent conjugation interaction between a dendritic polymer and at least one inorganic material creating a conjugate, in which the distribution of said inorganic material follows the motif of size and size-distribution of the dendritic polymer, and, in which both the dendritic polymer and the nanosized inorganic materials conjugated to the dendritic polymer each retain their respective identities as well as their respective physical and chemical properties on account of the absence of covalent interaction between these separate entities. In a second step, the nanosized inorganic material or materials are reacted to form a nanostructural composite material in which the reaction product is constrained with respect to the dendritic polymer, without being covalently bonded to the dendritic polymer.

DESCRIPTION OF THE PREFERRED EMBODIMENTS

The ability to fabricate nanometer-scale objects identically replicated in unlimited quantities is an ultimate challenge in modern materials research. Success in this area offers outstanding fundamental and potential technological consequences.

This invention makes possible the definition of shape and size of materials at a nanoscopic scale. This scale represents a transition of physical and chemical properties between atomic and bulk material. Successful, simple and economic preparation of uniform nanomaterials is highly desirable. These novel nanocomposites display new, surprising and an important physical (such as solubility, optical, electronic, magnetic, etc.,) and chemical properties (reactivity, selectivity, etc.).

The methods of this invention provide simple and economic means for fabricating assemblies of nanometer-scale materials identically replicated in unlimited quantities with a predetermined composition, size, and size-distribution.

Figure 1:
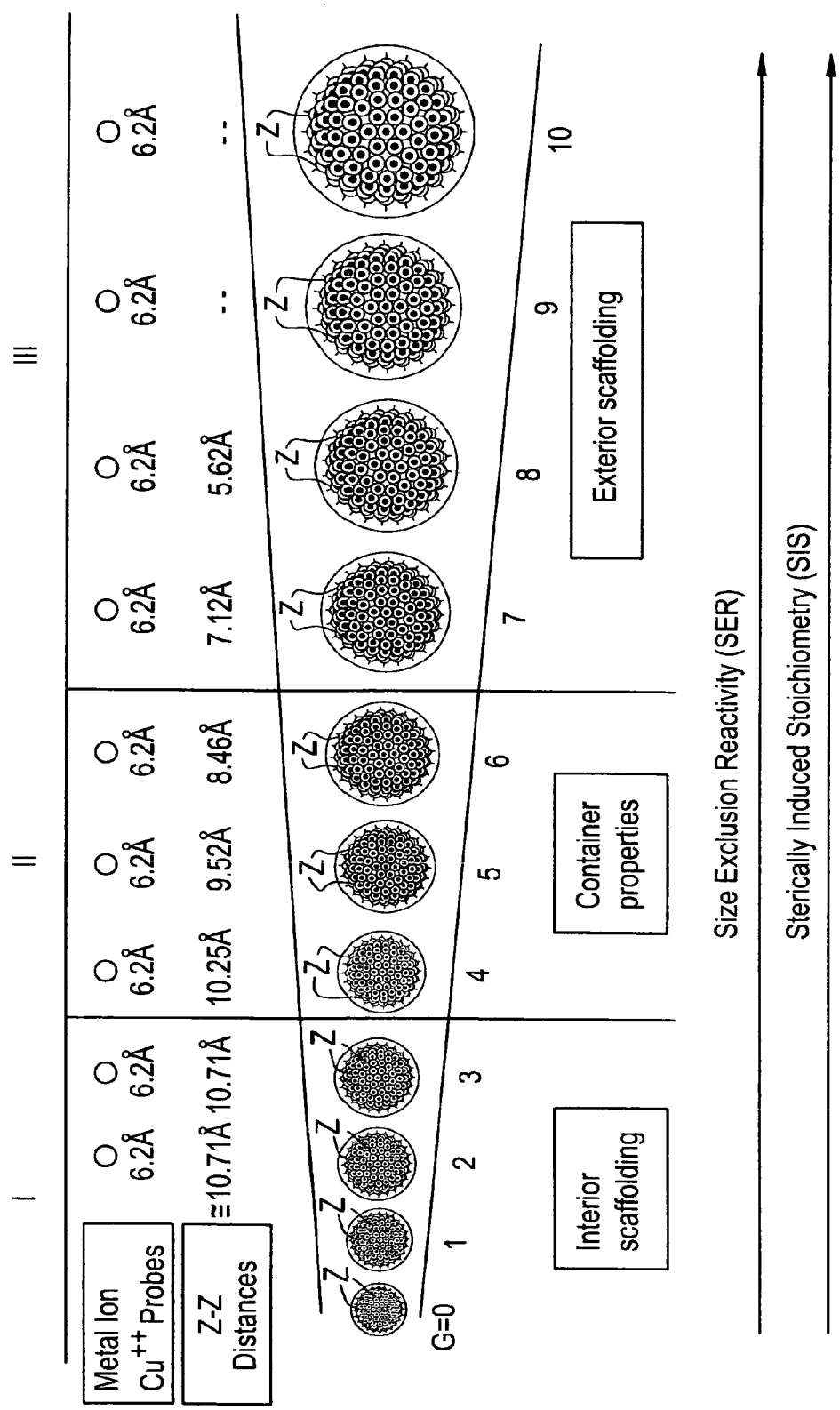
FIG. 1 shows interior scaffolding, container and surface scaffolding properties in polyamidoamine dendrimers as a function of generation, surface-group distances and probe-size.

Combinations of "zero dimensional" dendritic building blocks, i.e., dendrimers, dendrons, dendrigrafts and hyperbranched polymers into multiple structures with 1-D, 2-D and 3-D (dimensional) features such as chains, films, covalent and non-covalent clusters, crosslinked dendritic polymers and dendritic polymers afford a great structural and architectural variety for nanocomposite preparation. Utilizing the periodic properties (illustrated in FIG. 1) of these well-defined compounds, such as interior scaffolding, container and surface scaffolding properties, it is possible to define and control the size and size-distribution of the dispersed phase(s) in composite materials or conventional organic or inorganic polymers. Although FIG. 1 illustrates only the periodic properties of PAMAM dendrimers with respect to one particular metal ion, the periodicity of these three properties will be similar for any dendritic polymer and any interacting reactant. These periodic properties are the function size and properties of the probe compared to the nature and distance of the surface groups and the general structure of the dendritic polymer. Only the borders between interior scaffolding, container and surface scaffolding will be shifted.

The fundamental advantages of using dendritic polymers in this procedure are their well defined structure, size and size-distribution, and the fact, that they can contain guests or carry them on their surface due to their interior ligand-structure and variable surface structure.

It is also an advantage, that a molecular/atomic level of mixing can be achieved in these nanocomposites due to the nonspecific nature of diffusion in the first step. As a consequence, a macro-homogenous material with extremely narrow distributions in the dispersed phase can be obtained. A further advantage is that the dendritic intermediates (conjugates, precomposite materials) may be mixed, or they may be combined according to the state-of-the-art methods of dendrimer chemistry. Dendritic precomposites or composites may be further reacted with bi- or multifunctional monomers, oligomers or polymers, as well as dissolved or dispersed in a nonreactive matrix required by specific applications. Mixtures of dendritic nanocomposites can provide microheterogeneity at a nanoscopic level, expanding the methods of nano-engineering.

The most characteristic property of these new composites is that the pre-defined density-fluctuation of at least one component is determined at a nanoscopic level fundamentally by the dendritic polymer(s) used. This basic structure may also be influenced by the chemistry of other components.

Thus, appropriately synthesized and selected 0-D, 1-D, 2-D and 3-D dendritic polymer structures can be used as permanent or temporary templates.

Figure 2:
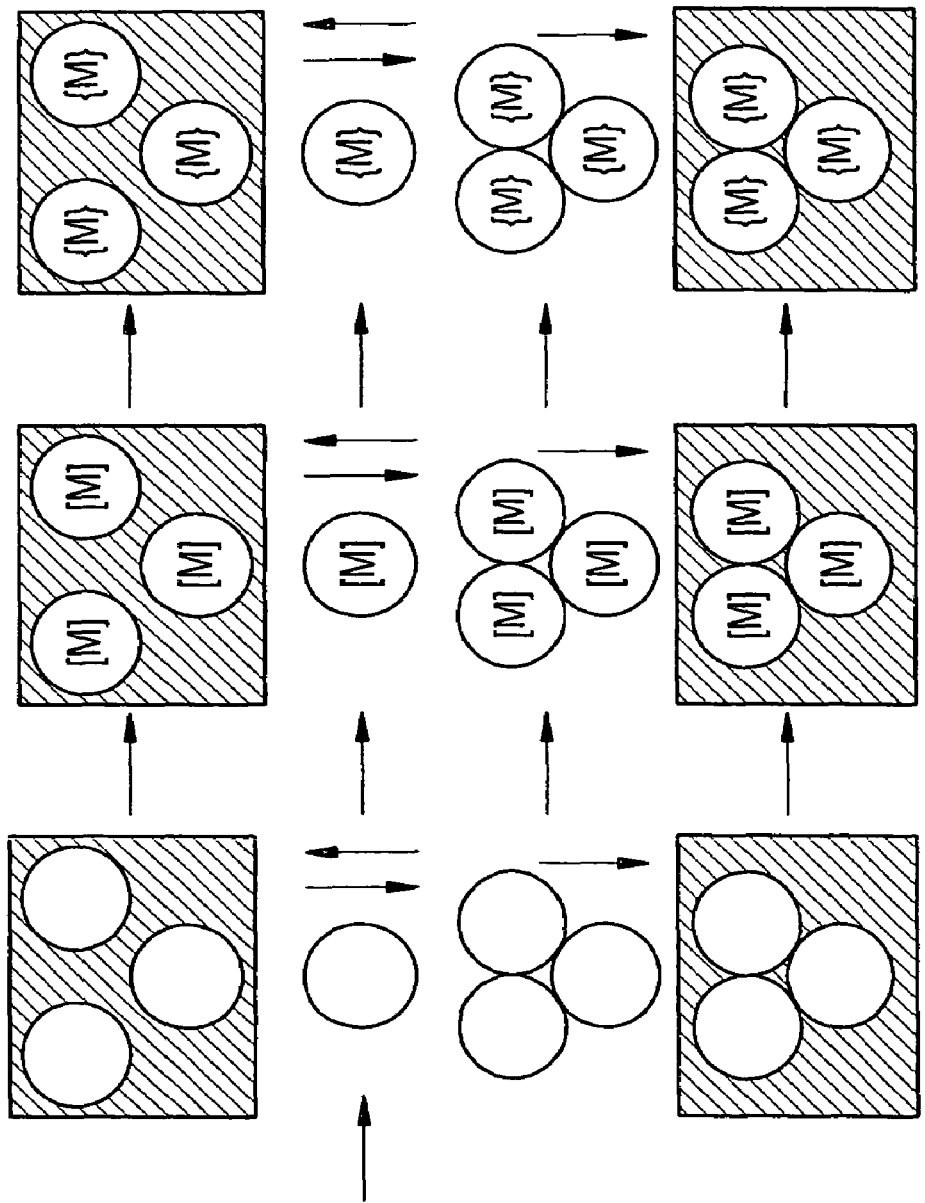
FIG. 2 shows a simplified scheme of transforming dendritic polymer molecules and a multiplicity of dendritic molecules into intermediates and nanocomposites.

Individual ("zero dimensional") dendritic polymers, as well as complexes of dendritic polymers, can be transformed into 1-D, 2-D and 3-D networks using their surface-functionalities. (In our nomenclature, a "zero-dimensional" (0-D) unit is an individual dendrimer, dendritic polymer or a dendritic cluster, a 1-D notation refers to chains, 2-D organizations refers to layers of nanocomposites, while 3-D networks are crosslinked dendritic polymers.) Similarly, 1-D, 2-D and 3-D dendritic networks may form a complex with metals and metalloids. Such a conjugate may also serve as a precursor to dendritic polymers with a higher dimensionality or to a dendritic nanocomposite (FIG. 2). Any of the 0-D, 1-D, 2-D and 3-D formations may be dispersed in a non-dendritic media (in either their physically or chemically bonded forms) before or after the chemical transformation. When this non-dendritic media is a gas, the product is a bulk of dendritic polymers containing non-covalently bound and nano-dispersed guest molecules (dendritic nanocomposites). When the non-dendritic medis is a solvent, the product is the solution of said nanocomposites. It may also be a suspension or emulsion. When the non-dendritic media is a solid containing dispersed dendritic nanocomposites, the product is a nanocomposite, in which the size and distribution of dispersed phase is determined by the dendritic nanocomposites. Dendritic polymers of any dimensional structure can be used as permanent or temporary templates for fabricating nanocomposites of metal and metalloid compounds. In these nanocomposites metal and metalloid compounds are dispersed in organic or inorganic matrices with a predetermined size and size-distribution.

Starting from any dimensional stage (left column), first, a temporary interaction (involving a non-covalent conjugation such as complexation, H-bonding, dipole-dipole interactions, London dispersion forces, Van der Waals interactions, etc.) is brought about between appropriately selected dendritic polymers and the first group of reactants (middle column). These intermediates then are chemically transformed in one or more steps into novel nanostructures (see FIG. 2) by either physical or chemical methods, such as reaction, heat, illumination, etc.

In these composites the size and size-distribution of the dispersed material(s) is determined and controlled by a dendritic polymer. This dendritic polymer may be one of the components, but also might be removed from the final product and its role is to provide a template for the material to be dispersed. The continuous phase of this final composite is not necessarily a dendritic polymer.

The method for the preparation of dendritic nanocomposites is carried out in two or more steps. The first step involves localization of reactants (atoms, ions or molecules) within a dendritic polymer.

Localization of a reactant refers to the reactant being located proximate or within the interior of an intermediate generation dendritic polymer for a period sufficient to enable reaction with the second reactant to form a product which is physically or chemically trapped within the interior of the dendritic polymer; non-covalent conjugation with the interior scaffolding of a lower generation dendritic polymer having a structure which is relatively open and therefore does not have a well defined surface which is capable of restricting access to the interior scaffolding; and non-covalent conjugation with surface groups on generally any generation of dendritic polymer. Localization includes physical restraint of the reactant or reactants in the interior of the dendritic polymer and non-covalent bonding of the reactant or reactants with the interior or exterior of the dendritic polymer. Physical restraint may range from relatively transient containment of the reactant or reactants within the interior of the dendritic polymer to relatively permanent entrapment of the reactant or reactants in the interior or exterior of the dendritic polymer. Non-covalent bonding of the reactant or reactants with the interior or exterior of the dendritic polymer includes ionic bonding, donor acceptor interactions (coordination bonding), hydrogen bonding, Van der Waal interactions, and London dispersion interactions. The invention does not contemplate nanocomposites in which the dispersed phase is covalently bonded to the dendritic polymer. Covalent bonding would change the characteristics of the dendritic polymer and make it one of the reactants and a part of the final reaction product, due to the relatively irreversibility of covalent bonding. All of the other attractive forces (e.g., physical restraint, ionic bonding, coordination bonding, and hydrogen bonding) are, to a degree, significantly more reversible than covalent bonding.

During the first step of the process, guest atoms, ions and/or molecules diffuse to a dendritic macromolecule of intermediate generation and these guest atoms, ions or molecules become localized such as by physical restraint or non-covalent interactions with the surface or interior of the intermediate generation dendritic polymer; and/or guest atoms, ions and/or molecules become non-covalently conjugated to the surface groups of generally any generation of dendritic polymer; or guest atoms, ions and/or molecules become non-covalently conjugated to interior scaffolding or surface groups of a lower generation dendrimer. Examples of non-covalent bonding between the guest atoms, ions and/or molecules and the interior of the dendritic polymer molecule include ionic bonding, hydrogen bonding, donor-acceptor, coordination bonding, Van der Waals interactions, and London dispersion forces. The driving force of the diffusion into the interior or an intermediate generation dendrimer is the extremely high local concentration of coordination moieties or active binding sites (such as N, NH, O, P, etc. atoms) in the interior.

As opposed to small molecular complexing agents, dendritic polymers do not hinder the formation of new chemical compounds, but retain the new compound(s) in their interior or on their exterior giving rise to revolutionary nanocomposites. Thus, chemical transformation of the reactant(s) into a new chemical entity results in organic-inorganic composites in which nanoscopic guest molecules, clusters and nanoparticles are trapped by dendritic surfaces of intermediate generation dendritic polymers, and/or are retained by non-covalent conjugation with the interior scaffolding of lower generation dendritic polymers, or are retained by non-covalent conjugation with the exterior functional groups of generally any generation of dendritic polymer.

The second step of the method involves transformation of the nanosized inorganic reactant or reactants. Such transformation include reactions involving two or more localized reactants, as well as reactions involving transformation of a single reactant, such as zero order decomposition reactions induced by chemical instability, heat, electromagnetic radiation, etc.

After an appropriately selected chemical or physical transformation into elements or compounds such as sulfides, halogenides, oxides, hydroxides, phosphates, sulfates, hydroxides, etc., these nanocomposites may preserve their chemical reactivity and they can be transformed into other nanocomposites by subsequent reactions. Also demonstrated is the ability of the nanocomposites to undergo physical changes, such as crystallization and change of their crystal morphology.

Lower generation dendritic polymers, e.g., 0 to generation 3 PAMAM dendrimers, typically are so open that they are incapable of constraining a reaction product when they are dispersed in a gas or liquid phase. However, when they are dispersed in a solid phase, they are capable of constraining a reaction product and serve as a template. These lower generation dendritic polymers may include interior scaffolding groups, i.e., functional groups located nearer to the core of the dendritic polymer than the exterior or surface groups which are capable of activating non-covalent interactions with a guest atom, ion or molecule, as well as exterior or surface functional groups which are capable of achieving non-covalent interactions with a guest atom, ion and/or molecule. As another example, relatively higher generation dendrimers, such as generation 7 PAMAM dendrimers and higher, may not be sufficiently permeable to permit reactants to enter the interior of the dendritic polymer. However, these higher generation dendritic polymers may include exterior or surface functional groups capable of achieving non-covalent interactions with guest atoms, ions, and/or molecules. In the case of poly(amidoamine) dendrimers, generations 4 through 6 generally exhibit intermediate generation properties because they have an interior which is accessible to a wide variety of reactants of interest. Generation zero through 3 PAMAM dendrimers exhibit lower generation internal scaffolding properties in which guest atoms, ions, and/or molecules may be non-covalently conjugated to interior functional groups, but cannot be contained within a well defined interior. Generation 7 and higher PAMAM dendrimers exhibit higher generation properties wherein guest atoms, ions, and/or molecules may not interact with the interior thereof, but can become non-covalently conjugated to surface groups thereof.

In accordance with one aspect of this invention there is provided a method in which one or more molecules each of at least one reactant is allowed to pass through a permeable surface of an intermediate generation dendritic polymer and are reacted in an interior of the dendritic polymer. The permeable surface allows passage of the reactant or reactants. However, the surface is not sufficiently permeable to allow passage of the reaction product, thus trapping the product in the interior of the dendritic polymer. The first step of the method involves localization of at least one reactant within the interior of the dendritic polymer. Localization within the dendritic polymer may be achieved by any mechanism which allows the reactant or reactants to reside in the interior of the dendritic polymer for a period sufficient to enable reaction of the reactant or reactants to form a product which is larger than the reactant or reactants and which is trapped within the dendritic polymer. Localization includes physical restraint, whether transient or relatively permanent, and non-covalent bonding with the interior of the dendritic polymer. Examples of non-covalent bonding between the reactant or reactants and the dendritic polymer include ionic bonding, hydrogen bonding, donor-acceptor interactions, coordinative bonding, Van der Waal interactions, and London dispersion forces. The reactant or reactants are then transformed into a reaction product which may be the product or two or more reactants or the product of a single reactant, such as a decomposition product. The reaction product formed is either physically constrained relatively permanently within the interior of the dendritic polymer molecule or is constrained within the dendritic polymer molecule by non-covalent bonding with the interior of the dendritic polymer molecule and immobilized with respect to the polymer molecule.

This method can be used, for example, to solubilize insoluble compounds. Thus among the types of unique composite compositions contemplated by this invention are those in which a nanosized dendritic polymer acts as a molecular vessel soluble in a particular solvent, while the reaction product trapped within the nanosized dendritic polymer molecular vessel is insoluble in that solvent. In this manner, revolutionary products such as water-soluble elemental metals, e.g., water-soluble copper, gold, silver, water-soluble iron and cobolt, can be produced. This invention contemplates water-soluble magnets. Other examples include water-soluble silver halides and water-soluble metal sulfides.

In accordance with another aspect of the invention there is provided a method in which one or more molecules each of at least one reactant are localized with respect to the lower generation dendritic polymer by contacting the reactant or reactants with a lower generation dendritic polymer and allowing the reactant or reactants to non-covalently interact with, and become non-covalently conjugated to, interior scaffolding groups of the lower generation dendritic polymer. The openness of the lower generation dendritic polymers provides accessible interior functional groups to which the reactant(s) can be non-covalently conjugated, but does not allow physical constraint within a well defined interior, without appropriately selected surface groups or inclusion into a solid phase. Non-covalent conjugation or bonding between the reactant or reactants and the internal scaffolding groups of the lower generation dendritic polymers may include ionic bonding, donor-acceptor interactions, coordination bonds, hydrogen bonding, Van der Waal interactions, London dispersion interactions, etc. As with the nanocomposites formed between the intermediate generation dendritic polymers having a well defined surface and interior, the conjugates, formed by interaction between the internal scaffolding groups of lower generation dendritic polymers, the localized inorganic reactant or reactants are transformed into a reaction product which may be the product of two or more reactants or the product of a single reactant, such as a decomposition product.

In accordance with a further aspect of the invention, there is provided a method in which one or more molecules each of at least one reactant is localized with respect to a dendritic polymer of generally any generation by contacting a dendritic polymer having surface functional groups with the reactant or reactants and allowing the reactant or reactants to non-covalently interact with, and become non-covalently conjugated to, the exterior surface functional groups of the dendritic polymer. Non-covalent conjugate or bonding between the reactant or reactants and the exterior surface functional groups of the dendritic polymer may include ionic bonding, hydrogen bonding, Van der Waal interactions, London dispersion interactions, donor-acceptor bonding, coordination bonding, etc. The localized inorganic reactant or reactants are subsequently transformed into a reaction product which may be the product of two or more reactants or the product of a single reactant, such as a decomposition product.

In the case of lower generation dendritic polymers having a relatively open structure, without a well defined interior or surface, an inorganic reactant or reactants may be localized by interactions with interior scaffolding functional groups and/or with exterior surface groups. In the case of intermediate generation dendritic polymers, the reactant or reactants may be localized by being constrained within the interior of the dendritic polymer and/or localized by non-covalent interaction with exterior functional groups and/or interior functional groups of the dendritic polymer.

Another aspect of this invention relates to the distribution of nanosized inorganic compounds in a polymeric matrix material. Polymeric matrix materials include generally any polymer capable of forming a continuous matrix phase of a composite material. Polymeric matrix materials can contain the dendritic nanocomposites in different ways, such as:

A. A chemical bond between the matrix and the dendritic polymer. This usually involves a dendritic polymer bearing polymerizable groups, such as amino methacrylate, OH, ester, etc. (Amino groups readily interact) which is polymerized or copolymerized with an other monomer; and B. The dendritic nanocomposite physically dispersed such as in a polymer, a solution of a polymer, a solution of a monomer, or in a monomer followed by polymerization of the monomer.

The dispersed phase can be comprised of dendritic polymers organized into zero, one, two or three dimensional structures, and having the localized inorganic reaction products described herein constrained within the interior of an intermediate generation dendritic polymer, non-covalently conjugated to the interior scaffolding functional groups of a lower generation dendritic polymer, non-covalently conjugated to the exterior functional groups of generally any generation dendritic polymer, non-covalently conjugated to both interior scaffolding functional groups and exterior surface groups of a lower generation dendritic polymer, or both constrained within the interior of an intermediate generation dendritic polymer and non-covalently conjugated to the exterior surface functional groups of the intermediate generation dendritic polymer. The invention also includes composite materials in which the inorganic compound is distributed by physical methods as discrete nanosized entities dispersed in a polymeric matrix, and in which the dendritic polymers used to determine and control the size and size distribution of the inorganic material are removed by pyrolysis. Such composites are prepared by distributing the dendritic nanocomposition comprising a dendritic polymer matrix and subsequently subjecting the composite to an elevated temperature for a sufficient period of time to cause the dendritic polymer to decompose, preferably without causing any degradation of the matrix material.

The dendritic polymer can be distributed in a polymeric matrix either before the reactant or reactants are localized with respect to the dendritic polymer, and either before or after the reactant or reactants are transformed.

These organic-inorganic nanocomposites display new and surprising properties.

Figure 3:
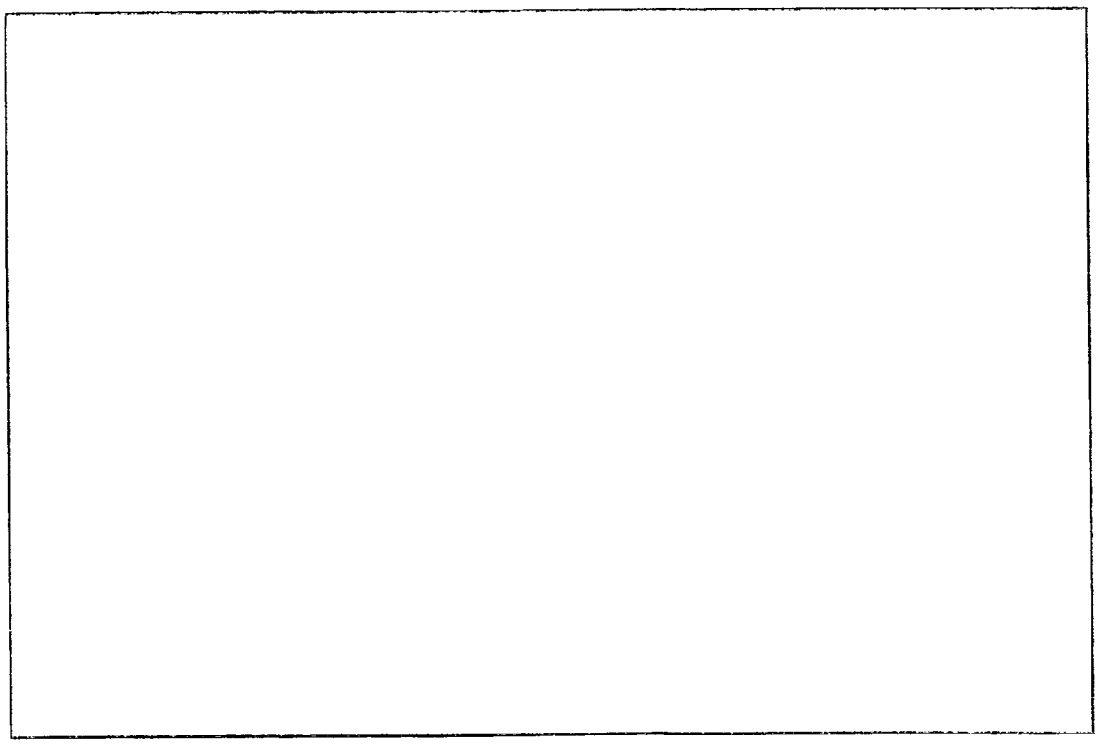
FIG. 3 is a unstained TEM micrograph of the {Cu$_2$S-G4.T} nanocomposite at a magnification of 200,000.

Unstained transmission electron micrographs (TEM) show the nanocomposites with a high contrast due to their metal content (FIG. 3).

Figure 3A:
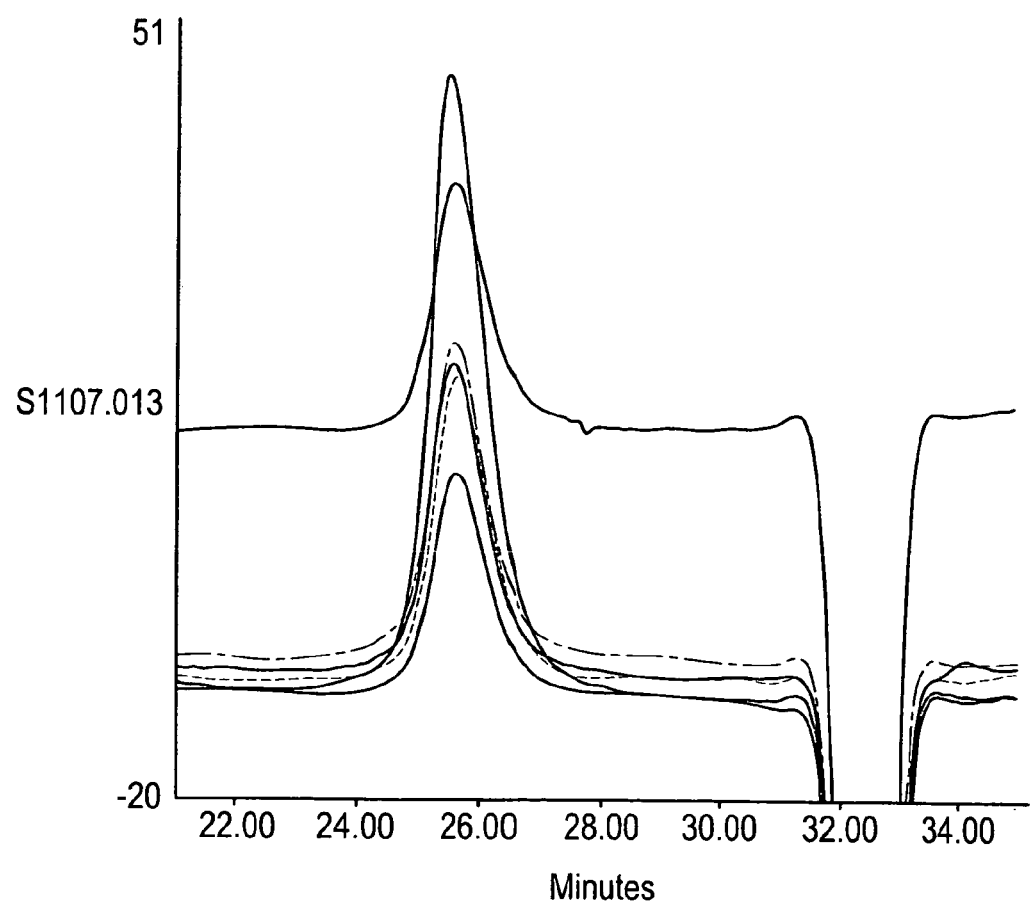
FIG. 3A is a comparison of SEC-chromatograms of PAMAM G4.T dendrimer, and of five different nanocomposites (with Ag$_2$S, ZnS, CuS, Cu$_2$S and CdS)
Figure 3B:
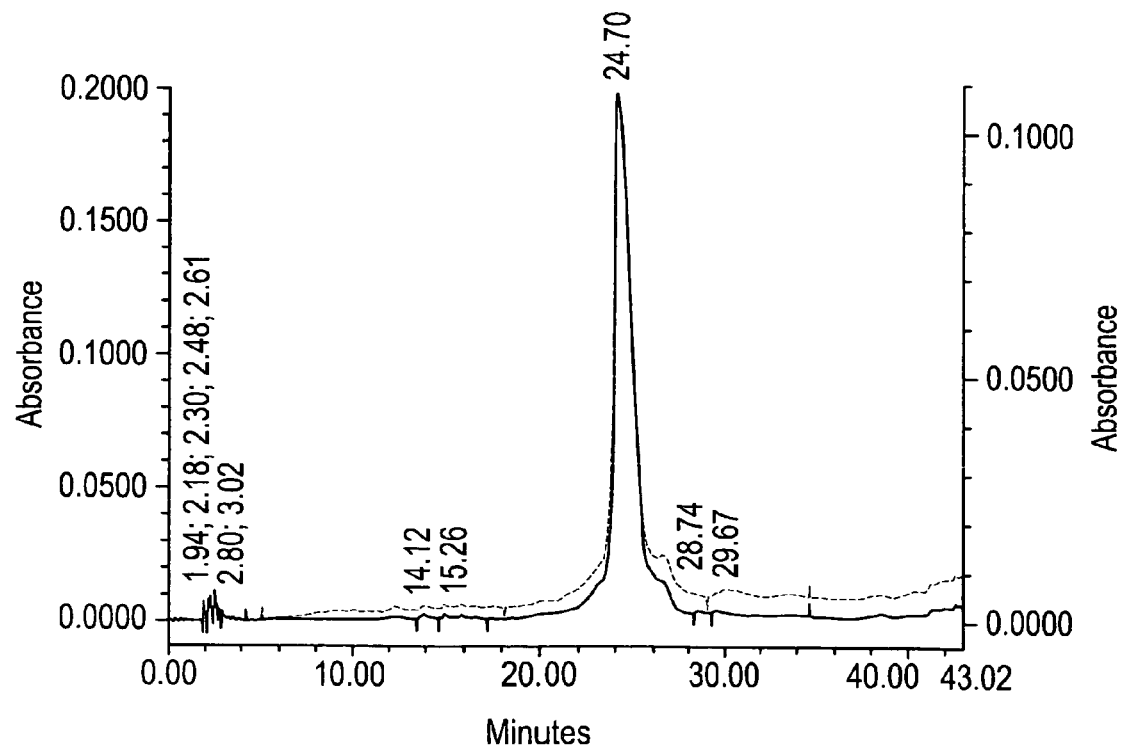
FIG. 3B is a comparison of the RP-IP-HPLC chromatogram of PAMAM G4.T and the {Ag$_2$S-G4T} nanocomposite wherein the continuous line represents pure dendrimer and the dotted line represents the nanocomposite.
Figure 3C:
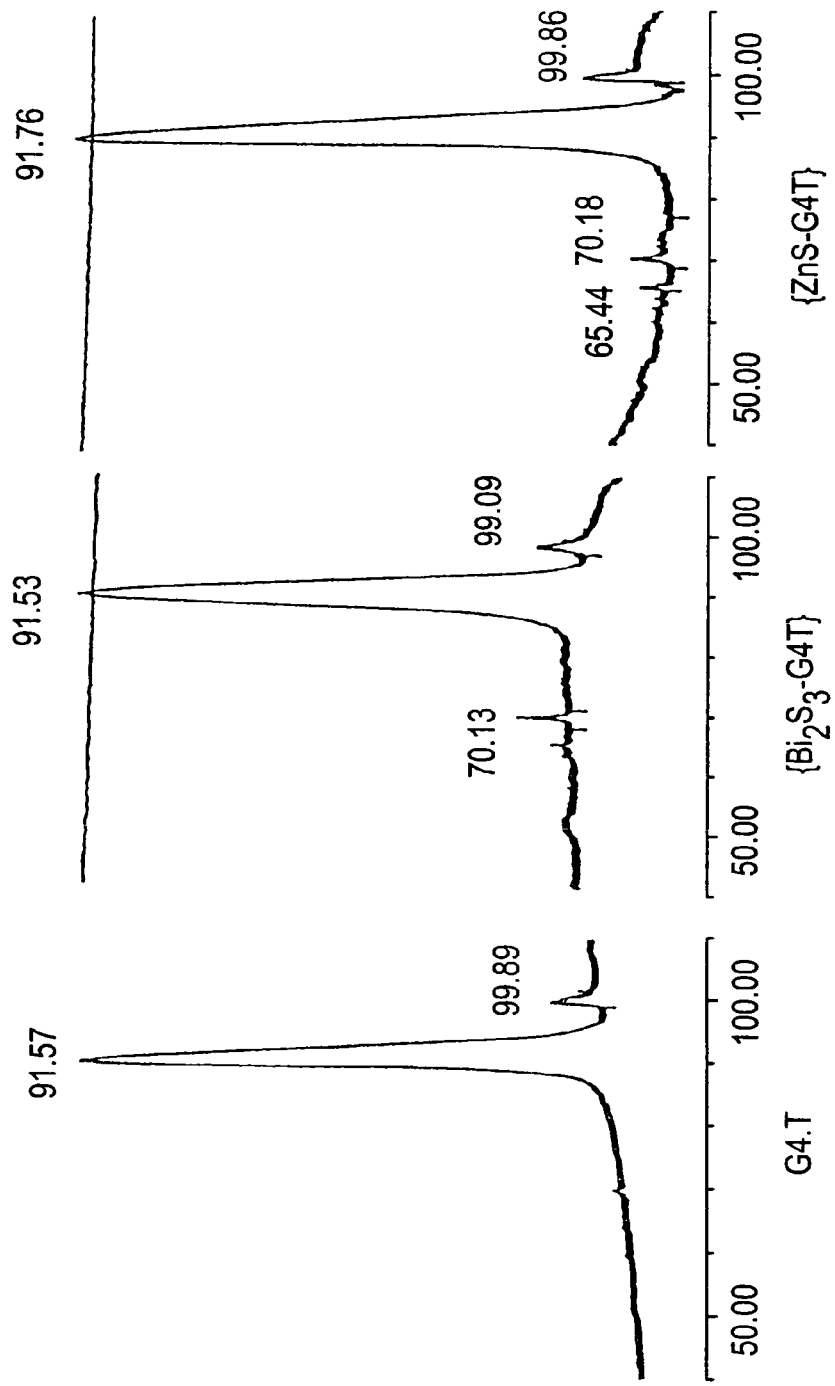
FIG. 3C is a comparison of capillary electropherograms of the host and two nanocomposites.

Hydrodynamic volumes of dendritic nanocomposites are practically identical with their host as measured by size exclusion chromatography (SEC) (FIG. 3A). Capillary electrophoresis (FIG. 3C) and ion-pair HPLC on a reversed phase (FIG. 3B) indicates no or minor changes in the surface properties and sizes of the hosts.

Figure 4A:
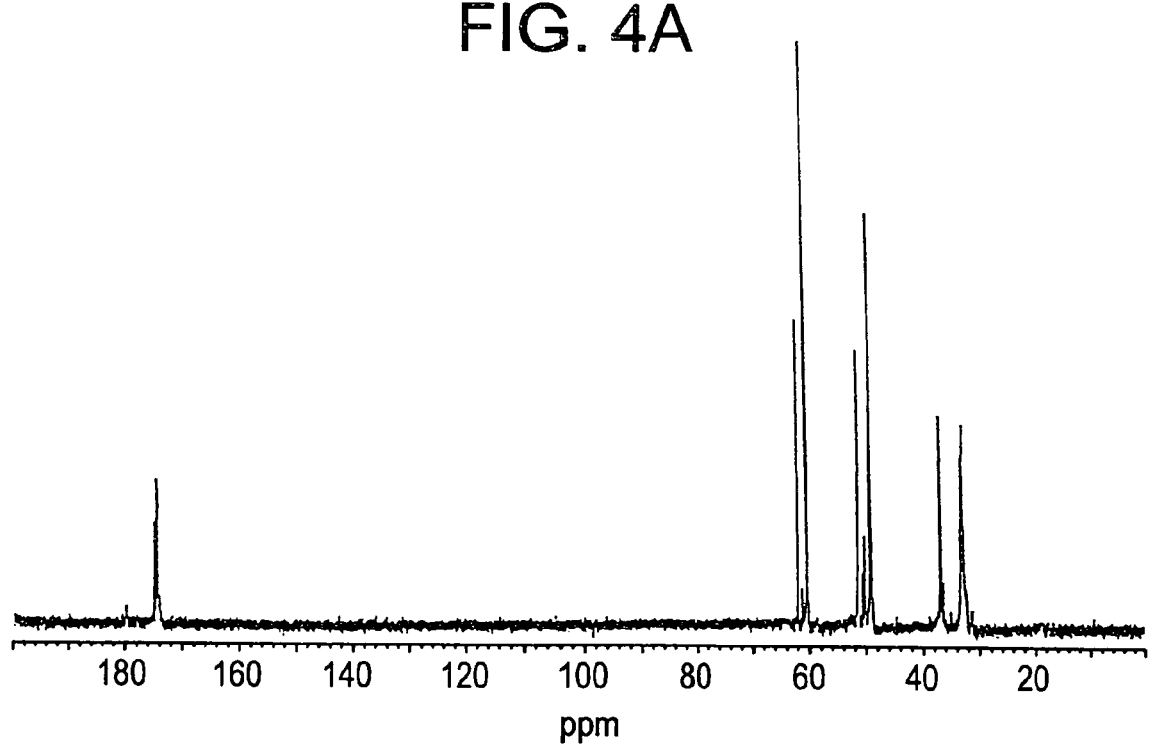
FIG. 4A is $^{13}$C NMR spectrum of G4.T.
Figure 4B:
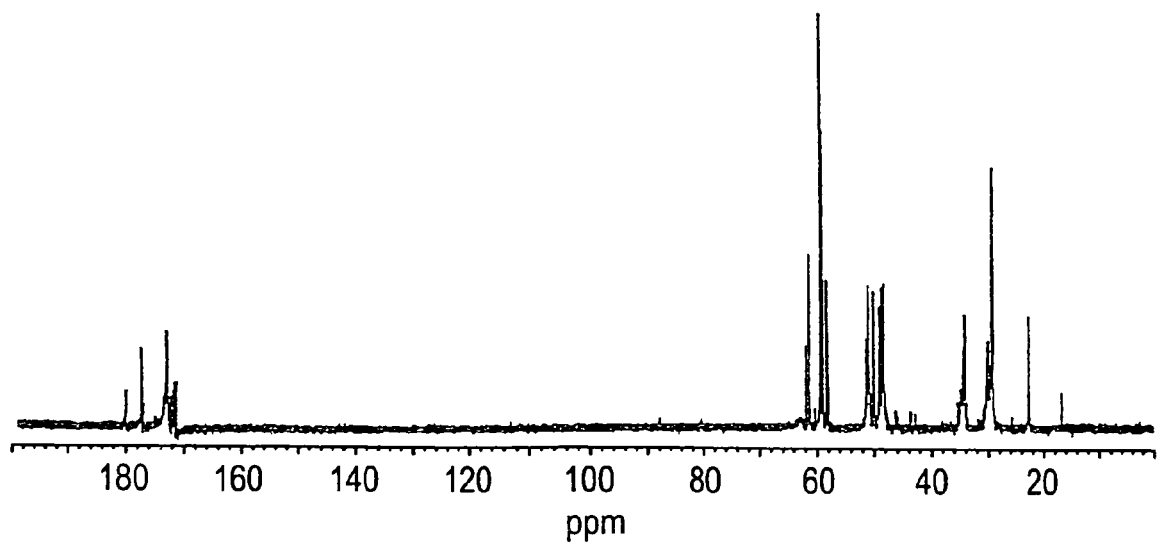
FIG. 4B is $^{13}$C NMR spectrum of {ZnS-G4.T} (CH$_3$COOH signals are due to the starting material, the Zn(II)-acetate)
Figure 5:
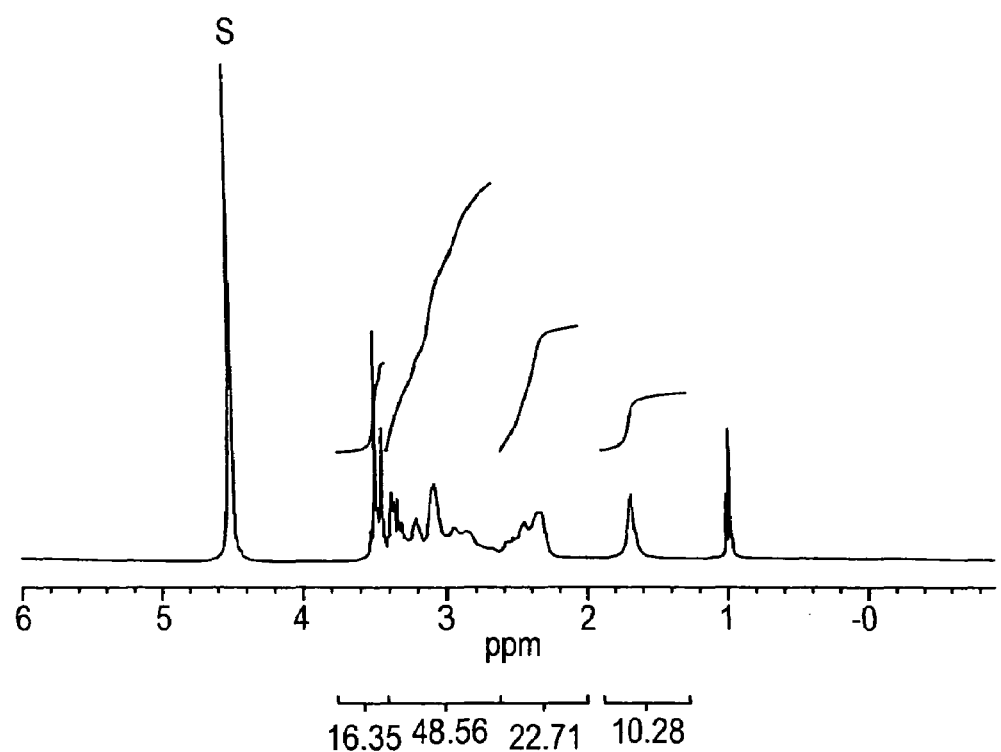
FIG. 5 is $^1$H NMR spectrum of the {Cu$_2$S-G4.T} (CH$_3$COOH signals originate from the Cu(II)-acetate starting material)
Figure 6:
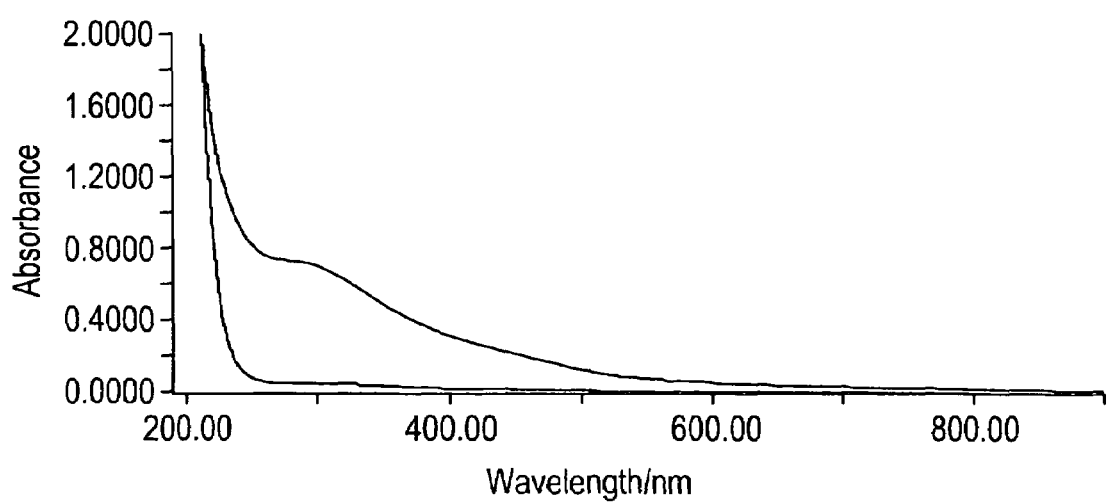
FIG. 6 is a comparison of UV-visible spectra of PAMAM G4.T and {Ag$_2$S-G4.T}. [Ag$_2$S]=7.78 mM, [G4.T]=0.25 mM, 2 mg/ml solution, L=0. 1 cm.
Figure 7:
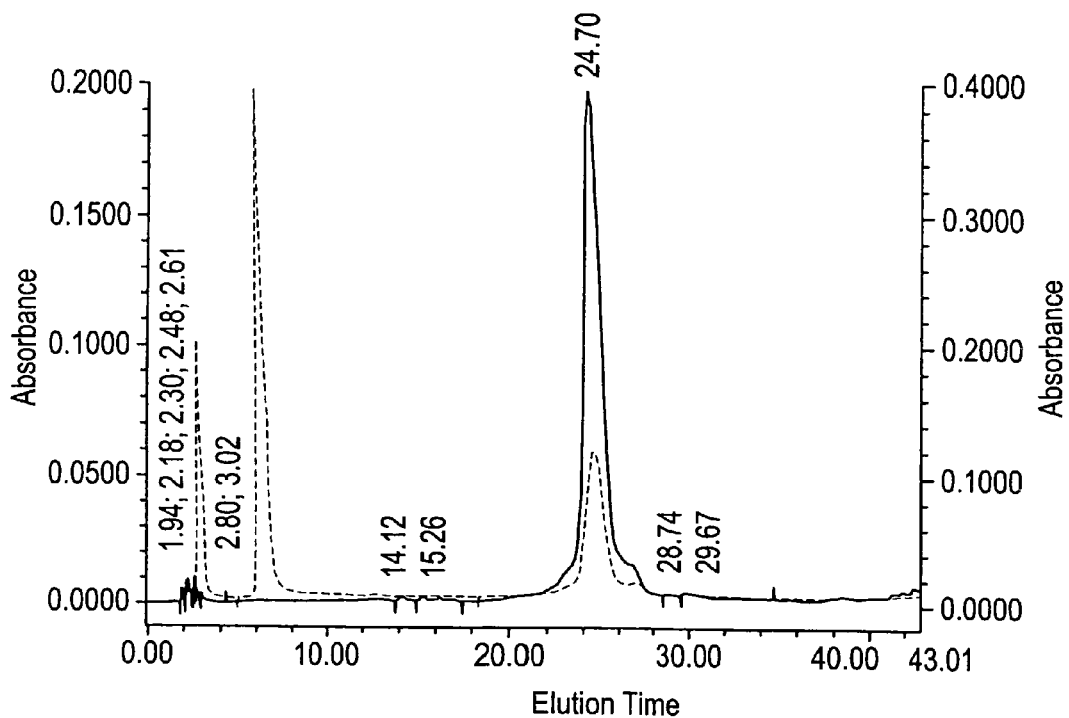
FIG. 7 is a comparison of the RP-IP-HPLC chromatogram of G4.T and its complex with Cu-acetate wherein the continuous line represents dendrimer and the dotted line represents the internal Cu-complex.
Figure 15:
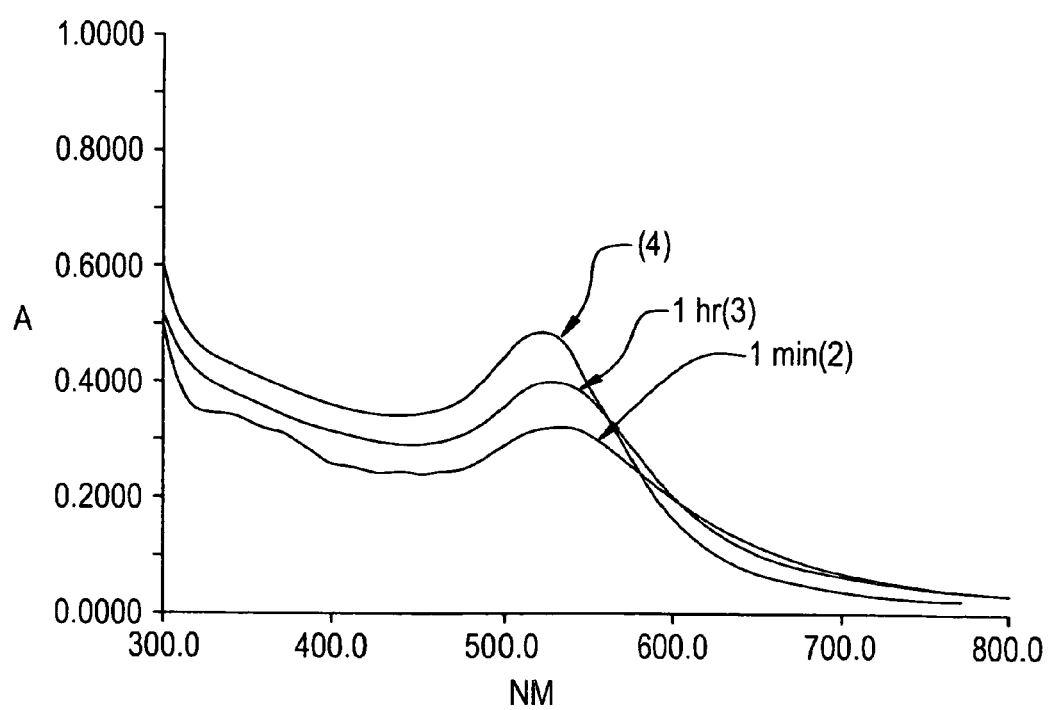
FIG. 15 is a graphical comparison of the UV-visible spectrum of the [(CuAc$_2$)$_{31}$-G4.(NHCHCH(OH)C$_4$H$_{10}$)$_{64}$] molecular complex and the corresponding nanocomposite solution, that contains elemental copper domains in the inverted dendritic micelle.

Their $^{13}$C NMR spectra (see FIGS. 4A and 4B) show split but narrow carbon signals suggesting that the metal atoms are localized. Lines observed in $^1$H NMR spectrum are generally broad and show that all the proton signals are affected by the presence of the metal atoms (FIG. 5). As most of the dendritic polymers absorb only in the UV (see e.g., FIG. 6), these nanocomposites generally display the characteristic color of the inorganic component or the characteristic color of their plasmon peak (FIG. 15). Dendritic nanocomposites in solution may undergo clustering, depending on their surface properties. Dendritic nanocomposite solutions often have a hazy appearance in a scattered light (Tyndall-effect), while the same solution appears to be transparent in transmitted light. Both phenomena are due to the nanometer-scale size of the particles dispersed.

As a consequence of considerable increase in their density with respect to the original dendritic polymer, solutions of dendritic nanocomposites often exhibit accelerated sedimentation without real precipitation. In the case of colored nanocomposites, a visible concentration-gradient may be observed in the solution due to the effect of the gravity.

Solubility of nanocomposites will be determined by the solubility of the dendritic host rather than the solubility of the guest compound or substance itself. Therefore, these dendritic nanocomposites may be soluble either in water, and/or polar or nonpolar organic solvents, depending on the solubility of their host. These solutions may behave as real solutions, subcolloidal or colloidal solutions in inorganic or organic solvents. Overall solubility of these nanocomposites is many orders of magnitude higher than would be expected from the solubility product of their un-encapsulated form. Due to the extremely small size of the inorganic component, a very high surface/mass ratio is established for the guest atoms, ions and/or molecules which contributes to their enhanced chemical activity.

In the preferred embodiment, the nanosized dendritic polymer molecular reaction vessels have a preferred mean diameter range of from about 10 to about 1,000 Angstroms, although they can be larger. A more preferred mean diameter range is from about 10 to about 600 Angstroms. Any of the dendritic polymers may be used. Preferred dendritic polymers include dense star polymers and hyper comb-branched polymers. The individual dendritic polymer nanoreactors can be aggregated together through physical or non-covalent interactions or covalent bonding to form larger, multi-celled reaction vessels before or after being exposed to a reactant. Suitable dendritic polymers include dendritic copolymers, such as the reaction product of linear, branched or crosslinked non-dendritic polymers with dendrimers, crosslinked dendrimers, covalently linked dendrimer clusters, etc.

The surface of the intermediate generation dendritic polymer molecular reaction vessel is relatively permeable to reactants, but is relatively impermeable to reaction product. The term "permeable" is intended to encompass composites in which the reactant may diffuse out of the dendritic polymer molecule over time, but not before the composite can be used for its intended purpose. Change of permeability may result from the change in the relative density of the surface groups (steric hindrance) or from the chemical characteristics of the surface, such as relative hydrophilicity or hydrophobicity or charge density.

The dendritic polymer does not have to be soluble, only accessible by diffusion. The use of soluble dendritic polymers however enables one to render normally insoluble compounds soluble and tractable.

Suitable dendritic polymers include PAMAM dense star polymers. Other preferred dendritic polymers include polypropylamine (POPAM) dendrimers and polyester dendrimers.

An infinite variety of reactants can be employed in the broader aspects of the invention. Especially preferred are reactants which can react to yield elemental metals. Their use in conjunction with soluble dendritic polymers leads to products such as soluble magnets and homogenous phase catalytic solutions using solvent soluble elemental metals.

The solvent dispersible products of the preferred embodiment comprise a metal or metalloid (e.g., As, Sb, B, C, Ge, Po, P, Se, Si, Te) compound, which is substantially insoluble in a solvent, complexed with a dendritic polymer, which is soluble in the solvent. The inorganic complexes are prepared by contacting a solution containing the first reactant with the coordination bonding sites of a dendritic polymer resulting in a complex or coordination compound, and subsequently contacting this complex with a reagent which reacts with the complexed compound to form a composite that contains one or more immobilized compounds dispersed on the nanoscale level, wherein the immobilized compound is normally substantially insoluble in the solvent in the absence of the dendritic polymer.

The dendritic polymers which may be used include generally any of the known dendritic architectures including dendrimers, regular dendrons, controlled hyperbranched polymers, dendrigrafts, and random hyperbranched polymers. Dendritic polymers are polymers with densely branched structures having a large number of reactive groups. A dendritic polymer includes several layers or generations of repeating units which all contain one or more branch points. Dendritic polymers, including dendrimers and hyperbranched polymers, are prepared by condensation reactions of monomeric units having at least two reactive groups. The dendrimers which can be used include those comprised of a plurality of dendrons that emanate from a common core which can be a single atom or a group of atoms. Each dendron generally consists of terminal surface groups, interior branch junctures having branching functionalities greater than or equal to two, and divalent connectors that covalently connect neighboring branching junctures.

Dendrons and dendrimers can be prepared by convergent or divergent synthesis.

Divergent synthesis of dendrons and dendrimers involves a molecular growth process which occurs through a consecutive series of geometrically progressive step-wise additions of branches upon branches in a radially outward molecular direction to produce an ordered arrangement of layered branched cells. Each dendritic macromolecule includes a core cell, one or more layers of internal cells, and an outer layer of surface cells, wherein each of the cells includes a single branch juncture. The cells can be the same or different in chemical structure and branching functionality. The surface branch cells may contain either chemically reactive or passive functional groups. Chemically reactive surface groups can be used for further extension of dendritic growth or for modification of dendritic molecular surfaces. The chemically passive groups may be used to physically modified dendritic surfaces, such as to adjust the ratio of hydrophobic to hydrophilic terminals, and/or to improve the solubility of the dendritic polymer for a particular solvent.

Convergent synthesis of dendrimers and dendrons involves a growth process which begins from what will become the surface of the dendron or dendrimer and progresses radially in a molecular direction toward a focal point or core. The dendritic polymers may be ideal or non-ideal, i.e., imperfect or defective. Imperfections are normally a consequence of either incomplete chemical reactions, or unavoidable competing side reactions. In practice, real dendritic polymers are generally nonideal, i.e., contain certain amounts of structural imperfections.

The hyperbranched polymers which may be used represent a class of dendritic polymers which contain high levels of nonideal irregular branching as compared with the more nearly perfect regular structure of dendrons and dendrimers. Specifically, hyperbranched polymers contain a relatively high number of irregular branching areas in which not every repeat unit contains a branch juncture. The preparation and characterization of dendrimers, dendrons, random hyperbranched polymers, controlled hyperbranched polymers, and dendrigrafts is well known. Examples of dendimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example in U.S. Pat. No. 5,418,301.

The dendritic polymers or macromolecules useful in the practice of this invention are characterized by a relatively high degree of branching, which is defined as the number average fraction of branching groups per molecule, i.e., the ratio of terminal groups plus branch groups to the total number of terminal groups, branched groups and linear groups. For ideal dendrons and dendrimers, the degree of branching is 1. For linear polymers, the degree of branching is 0. Hyperbranched polymers have a degree of branching which is intermediate that of linear polymers and ideal dendrimers, a degree of branching of at least about 0.5 or higher is preferred. The degree of branching is expressed as follows:

$$f_{br} = \frac{N_t + N_b}{N_t + N_b + N_1}$$

where $N_x$, is the number of type x units in the structure. Both terminal (type t) and branched (type b) units contribute to the fully branched structure whilst linear (type 1) units reduce the branching factor; hence $$0 \leq f_{br} \leq 1$$

where $f_{br}=0$ represents the case of a linear polymer and $f_{br}=1$ represents the case of a fully branched macromolecule.

Dendritic polymers suitable for use with the invention also include macromolecules commonly referred to as cascade molecules, arborols, arborescent grafted molecules, and the like. Suitable dendritic polymers also include bridged dendritic polymers, i.e., dendritic macromolecules linked together either through surface functional groups or through a linking molecule connecting surface functional groups together, and dendritic polymer aggregates held together by physical forces. Also included are spherical-shaped dendritic polymers and rod-shaped dendritic polymers grown from a polymeric core.

The dendritic polymers used in the practice of this invention can be generationally monodisperse or generationally polydisperse. Dendritic polymers in a monodisperse solution are substantially all of the same generation, and hence of uniform size and shape. The dendritic polymers in the polydisperse solution comprise a distribution of different generation polymers. The dendritic polymer molecules which may be used in the practice of this invention include mixtures of different interior and exterior compositions or functionalities. Examples of suitable dendritic polymers include poly(ether) dendrons, dendrimers and hyperbranched polymers, poly(ester) dendrons, dendrimers and hyperbranched polymers, poly(thioether) dendrons, dendrimers and hyperbranched polymers, and poly(arylalkylene ether) dendritic polymers. Poly(amidoamine) (PAMAM) dendrimers have been found to be particularly useful for preparing the metal-containing complexes of this invention.

Dendritic polymers which are useful in the practice of this invention include those that have symmetrical branch cells (arms of equal length, e.g., PAMAM dendrimers) and those having unsymmetrical branch cells (arms of unequal length, e.g. lysine-branched dendrimers) branched dendrimers, cascade molecules, arborols, and the like.

The term "dendritic polymer" also includes so-called "hyper comb-branched" polymers. These comprise non-crosslinked poly-branched polymers prepared by (1) forming a first set of linear polymer branches by initiating the polymerization of a first set of monomers which are either protected against or non-reactive to branching and grafting, during polymerization, each of the branches having a reactive end unit upon completion of polymerization, the reactive end units being incapable of reacting with each other; (2) grafting the branches to a core molecule or core polymer having a plurality of reactive sites capable of reacting, with the reactive end groups on the branches; (3) either deprotecting or activating a plurality of monomeric units on each of the branches to create reactive sites; (4) separately forming a second set of linear polymer branches by repeating step (1) with a second set of monomers; (5) attaching the second set of branches to the first set of branches by reacting the reactive end groups of the second set of branches with the reactive sites on the first set of branches, and then repeating steps (3), (4) and (5) above to add one or more subsequent sets of branches. Such hyper comb-branched polymers are disclosed in European Patent Publication 0473088A2. A representative formula for such hyper comb-branched polymer is:

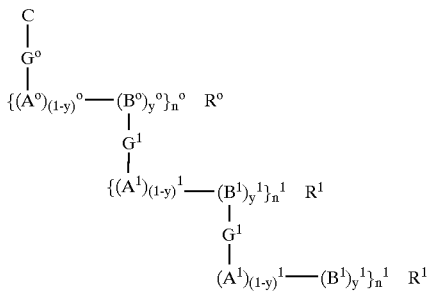

wherein C is a core molecule; each R is the residual moiety of an initiator selected from a group consisting of free radical initiators, cationic initiators, anionic initiators, coordination polymerization initiators and group transfer initiators; A and B are polymerizable monomers or comonomers capable of withstanding the conditions required for branching therefrom or grafting thereto, at least during the polymerization of the {(A)-(B)} linear polymer chain and during its grafting to a prior {(A)-(B)} branch of the {(A)-(B)} core branch; each G is a grafting component, and the designation

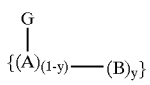

indicates that G can attach to either an (A) unit or a (B) unit; n is the degree of polymerization of the indicated generation comb-branches; y is the fraction of B units in the indicated generation branch, and has a value of 0.01 to 1; the superscripts 0, 1 and i designate the comb-branch generation level, with i beginning at "2" and continuing for the number of reiterative branch set generations in the polymer; and at least $n^0$ and n' are $\geq 2$.

For purposes of clarifying terminology, it should be noted that dense star dendrimers are built by reiterative terminal branching, while hyper comb-branched dendrimers are built by reiterative comb-branching. In dense star dendrimers, subsequent generation branches are attached to the terminal moieties of a previous generation, thus limiting the degree of branching to the functionality of the previous generation terminal moiety, which would typically be two or three. In contrast, by branching oligomers upon prior generation oligomer branches in accordance with hyper comb-branched dendrimer, one can dramatically increase the degree of branching from generation to generation, and indeed can vary the degree of branching from generation to generation.

Dendritic polymers, especially dendrimers, may contain coordination moieties or binding sites which are capable of non-covalently bonding with metals and or metal-containing compounds to complex with and localize such metals, metal-containing compounds or metalloid-containing compounds within the dendritic polymer. For example, PAMAM dendrimers possess both tertiary amines and amide groups which are present according to mathematically driven dendritic rules. In addition to internal complexation, diffusion resistance towards the surface of the dendrimer increases for any guest molecule or compound due to the radially increasing density of the dendrimer interior. This resistance also increases with the number of generations and provides a diffusion barrier which helps keep complexed molecules or atoms inside the dendrimer. Accordingly, higher generation dendrimers, such as fourth and higher generation dendrimers, are preferred for the PAMAM family of dendrimers in solution.

The metal ion solutions which may be contacted with a dendritic polymer to form the metal-containing complexes of this invention include inorganic salt solutions in which the metal or metal-containing compounds are present as soluble ions. When such inorganic salt solutions are mixed with dendritic polymers, the metal ions or metal-containing ions diffuse to the dendritic polymer and interact with available binding sites and become complexed by the dendritic polymer, or by a solvent contained within the interior of the dendritic polymer. The solvent, such as water, contained within the dendritic polymer can be different from the solvent in which the outer surface of the dendrimer is dissolved. Depending on the internal architecture, and the number, quality and density of the surface functional groups, complexation may take place in the interior only, or both in the interior and on the exterior of the dendritic polymer. The high local concentration of covalently connected coordination binding sites in the dendritic polymers and the diffusion barrier at the surface of the dendritic polymers enables these molecules to immobilize and retain compounds. Dendritic polymers with internal binding sites can be regarded as nanosized organic containers and/or nanosized reactors. Because the retained compounds are not covalently bonded to the dendritic polymer, they can undergo chemical reactions in accordance with their nature and reactivity.

Examples of suitable inorganic salt solutions which can be contacted with dendritic polymers to form metal-containing complexes include metal acetates such a cadmium acetate, copper acetate, zinc acetate, and lead acetate; metal sulfates, such as iron sulfate; and metal trifluoromethanesulfonates, such as silver trifluoromethanesulfonate. Other examples are set forth in the Experimental Section below.

The soluble metal-containing ion solution is contacted with a dendritic polymer to form a metal-dendritic polymer complex. The dendritic polymer is preferably solubilized in or swelled with a solvent prior to combining with the soluble metal-containing ion solution. The metal-dendritic polymer complex is subsequently contacted with a reagent which reacts with the complexed metal compound to form a different metal compound which is substantially insoluble in the absence of the dendritic polymer. For example, any of various complexes formed by combining metal-acetates with a dendritic polymer may be reacted with hydrogen sulfide to form metal sulfide/dendritic polymer composites which are highly soluble, as opposed to the metal sulfides which are insoluble in most liquids such as water and organic solvents. As another example, a silver trifluoromethanesulfonate-dendritic polymer complex [$CF_3SO_3Ag$-D] can be reacted with hydrogen sulfide gas to produce a silver sulfide/dendritic polymer composite which is soluble in water and/or organic solvents. An iron sulfate ($FeSO_4$)/dendritic polymer complex can be reacted with hydrogen sulfide gas to form an iron sulfide/dendritic polymer complex which is soluble in water and/or a variety of organic solvents. Examples of various metal sulfide, metal halogenide, metal hydroxide, metal oxalate, metal phosphate, and elemental metal contained within a soluble dendritic polymer are set forth in the examples below.

The complexation of metal-containing compounds combined with the dendritic diffusion barrier create single/individual organic containers/reactors having sizes in the range of from about 10 to about 200 Angstroms, depending upon the generation of the dendritic polymer and the particular structure and family of dendritic polymer used. Among other parameters, such as solvent, temperature, dendrimer type and generation, capacity of the nanoreactors will depend on the nature, number, quality and position of the coordination moieties or binding sites. Insoluble compounds can be immobilized and at the same time solubilized according to the solubility of the dendritic polymer host, rather than the solubility of the metal or substance itself. During this immobilization, atoms, ions and molecules become trapped in the polymer due to the combined effect of the complexation and the dendritic diffusion barrier. Thus, compounds which are commonly regarded as being insoluble, such as metal sulfides, halogenides, sulfates, phosphates, oxalates, etc., and metals themselves, can behave as real solutions in water as stable subcolloid solutions in organic solvents.

The metal compound concentration of these solutions can be many orders of magnitude higher than expected from the non-encapsulated solubility product of the metal compound in water or organic solvents. As a consequence, the metal-loaded dendritic containers display new and surprising properties. Dendrimer encapsulated compounds may enter chemical reactions without precipitation from the solvents in which they are dispersed.

Furthermore, the dendritic surface may be chemically modified without closing the dendrimer surface, preserving permeability and for fine-tuning the nanocomposite formation. For example, hydroxyl, carboxyl, or amine-terminated dendritic polymers can be reacted with an epoxy-terminated alkane, such as 1,2-epoxydecane, to form a dendritic polymer having a hydrophobic surface. Thus, the surface of the dendritic polymer of the metal-containing compound/dendritic polymer complex can be modified as desired to facilitate solubility of the complex in non-polar organic solvents, including alkyl and aromatic solvents. Alternatively, the surface of the dendritic polymer can be provided with functional groups, such as hydroxyl, carboxyl or amine groups, which facilitate solubility of the complex in water and/or polar organic solvents, such as alcohols. Using difunctional reactants it is possible to attach a polymerizable group to the surface of the dendritic polymer, or crosslink the dendritic polymer.

Practical Use:

This method extends the potential use of numerous inorganic materials and compounds (such as sulfides, halogenides, sulfates, and other chemical entities) to applications which were not previously possible because of the overall insolubility (see Table I) or intractability of such substances. The method also makes it possible to synthesize revolutionally new chemical entities, which were not available before, by employing molecular size scaffolds with well defined and exactly known structure as nanoreactors and use the same nanoreactors as containers or templates with chemically reactive surfaces for the atomic level dispersion of the components additional to the dendritic polymers in the composites. For example, the inventors have discovered that extremely small magnets can be prepared which do not exhibit any hysteresis, that is the material's magnetic properties do not change when a magnetic field is repeatedly applied to it.

These dendritic nanocomposites may be further transformed into clusters, gels, networks and other useful macromolecular structures. Dendritic polymer encapsulated nanocomposites thus obtained will have useful chemical, catalytic, magnetic, optical, electrically conductive, photolytic and electroactive properties. These "nanoencapsulated" or "nanotemplated" compounds may enter into selective chemical reactions without precipitating from their host. Also, subsequent chemical transformation of the outer surface of a dendritic polymer nanocomposite may transform a soluble nanocomposite into an insoluble one, thus providing an effective way for selective removal of poisonous metals or metal-containing compounds from solvents. Solutions containing dendritic polymer composites may provide novel optical filters. Chemical coding with dendritic markers having any of various well defined ratios of different metals immobilized in the interior of a dendritic molecule can be used to tag various materials such as explosives.

It is envisioned that dendritic nanocomposites will have many uses including selective extraction, and selective drug-delivery to particular biological targets.

The invention will be described in further detail by reference to examples of metal sulfides, which are useful as semiconductors and magnetic resonance imaging agents and with reference to light and electromagnetic radiation sensitive silver salts, which are useful as photochemical reactants.

EXPERIMENTAL

To simplify the description of compounds, braces were used to indicate the nanocomposite structure while naming the inorganic component and sometimes the organic component within the braces. Thus, symbols, such as {$Cu(OH)_2$} and {CuOH-G4.T}, denote a nanocomposite which contains copper(II) hydroxide and a composite formed of CuOH and a PAMAM generation four, tris-modified (G4.T) dendrimer, respectively. Double underline denotes formation of a macroscopic precipitate (e.g., C$\underline{\underline{u}}$S) and brackets, such as [$Cu(NH_3)_4$]OH, indicate a $\mathrm{com}\overline{\overline{\mathrm{plex}}}$ compound.

The following experiments demonstrate and prove our concept without restricting the possibilities to the existing examples or limiting the area of other possible chemical transformations:

Example Group I: Preparation of copper containing nanocomposites.

Example Group II: Formation of metal sulfide solutions in water.

Example Group III: Preparation of AgOH, AgBr, AgCl, silver and gold nanocomposites.

Example Group IV: Preparation of methanolic silver bromide solution.

Example Group V: Preparation of copper sulfide solution in toluene.

Example Group VI: Comparison of sulfide nanocomposite formation in Astramol and Perstorp dendritic hosts.

Example Group VII: Preparation of magnetic dendritic nanocomposites using aqueous solutions of zero valence metals.

Example Group VIII: Preparation of miscellaneous water soluble dendritic nanocomposites.

Example Group IX: Preparation of miscellaneous insoluble dendritic nanocomposites and films.

Reagents Used in the Following Examples:

10 mM solutions of $AgCF_3SO_3$, $Bi(CH_3COO)_3$, $Cd(CH_3COO)_2 \times 2\ H_2O$, $Cu(CH_3COO)_2$, $\times H_2O$, $CaCl_2$, $CoCl_2$, $Pb(CH_3COO)_2 \times 3\ H_2O$, $FeSO_4$, $FeCl_3$, $Zn(CH_3COO)_2$, $HAuCl_4$, $Mn(CH_3COO)_2 \times 4\ H_2O$, oxalic acid $H_2S$ gas, cc $NH_4OH$ and glacial acetic acid, 100 mM solutions of $CaCl_2$, NaOH, NaCl, NaI, and KBr, ascorbic acid, ethylenediaminetetraacetic acid disodium salt, (Polyamidoamine) PAMAM-s:

1.0 ml of 1.0 mM solutions ($1.0 \times 10^{-6}$ mole) of:
  generation four (EDA core) PAMAM containing 64-$NH_2$ surface group and 124 internal ligands (tert-nitrogens and NH—CO groups) (G4.0), see Table II;
  generation four (EDA core) Tris-modified PAMAM dendrimer containing 192 primary aliphatic hydroxyl group as surface groups and 124 internal ligands (tert-nitrogens and NH—CO groups) (G4.T);
  generation four (EDA core) full generation pivaloyl-modified PAMAM dendrimer containing 128 tert-butyl group as surface groups and 256+128=384 internal ligands (tertnitrogens and NH—CO groups) (G5.P);
  generation four (EDA core) full generation ethanolamine-modified PAMAM dendrimer containing 128 aliphatic OH group as surface groups and 256 internal ligands (tert-nitrogens and NH—CO groups) (G5.OH);
  generation three to seven (EDA core) Tris-modified PAMAM dendrimer containing primary aliphatic hydroxides as surface groups and variable number of internal ligands (tert-nitrogens and NH—CO groups) as it is described in Table II;
  1.43 mM solution of generation four ($NH_3$ core) PAMAM modified by 1,2-epoxydecane (G4.EO10; hydrophobic surface).

TABLE II

Change of number of ligands in the EDA core PAMAM generations

| Generation | Number of Internal Ligands | Number of Surface $NH_2$ Groups | MW | Measured Diameter |
|---|---|---|---|---|
| G2.0 | 28 | 16 | 3,256 | 29 Å |
| G3.0 | 60 | 32 | 6,909 | 36 Å |
| G4.0 | 124 | 64 | 14,215 | 45 Å |
| G5.0 | 252 | 128 | 28,826 | 54 Å |
| G6.0 | 508 | 256 | 58,048 | 67 Å |
| G7.0 | 1020 | 512 | 116,493 | 81 Å |
| G8.0 | 2044 | 1024 | 233,383 | 97 Å |
| G9.0 | 4092 | 2048 | 467,162 | 114 Å |
| G10.0 | 8188 | 4096 | 934,720 | 135 Å |

TABLE III

Change of number of ligands in EDA core, tris-modified PAMAMs

| PAMAM Dendrimer | Number of Internal Ligands | Number of Surface OH Groups | MW |
|---|---|---|---|
| G2.T | 28 | 48 | 4,233 |
| G3.T | 60 | 96 | 8,863 |
| G4.T | 124 | 192 | 18,636 |
| G5.T | 252 | 384 | 36,644 |
| G6.T | 508 | 768 | 73,685 |
| G7.T | 1020 | 1536 | 147,765 |

ASTRAMOL™ (Polypropylenamine) Dendrimers:

1 mM solution of generation four polypropylenamine dendrimer (AM-4, $DAB(PA)_{64}$, FW=7,168; $r_G$=13.9 Å, containing 64 $NH_2$ group on the surface) in methanol.

TABLE IV

ASTRAMOL ™ (Polypropylenamine) dendrimers:

| Name | Number of Internal Ligands | Number of Surface Groups | MW | Measured Diameter |
|---|---|---|---|---|
| G1 = $DAB(CN)_8$ | 6 | 8 | 741 | 12 Å |
| G1 = $DAB(PA)_8$ | 6 | 8 | 773 | 13.8 Å |
| G2 = $DAB(CN)_{16}$ | 14 | 16 | 1,622 | 16 Å |
| G2 = $DAB(PA)_{16}$ | 14 | 16 | 1,687 | 18.6 Å |
| G3 = $DAB(CN)_{32}$ | 30 | 32 | 3,385 | 20.2 Å |
| G3 = $DAB(PA)_{32}$ | 30 | 32 | 3,514 | 23.2 Å |
| G4 = $DAB(CN)_8$ | 62 | 64 | 6,910 | 24.4 Å |
| G4 = $DAB(PA)_{64}$ | 62 | 64 | 7,168 | 27.8 Å |

PERSTORP™ (Hyperbranched Polyesters):

1 mM methanol solution of generation five hyperbranched polyester (PSG5, $Fw_{theror}$=14,754, containing 128 OH groups on the surface);

The ratio of metal ions to the dendritic macromolecules was based on the general assumption that a metal ion would be coordinated by four tertiary nitrogens and/or NHCO amide groups or by two surface-$NH_2$ amino groups of the given dendrimer. Of course, actual coordination numbers are function of many parameters. All experiments were performed at room temperature, unless otherwise noted.

EXAMPLES

We demonstrate our concept on the examples of insoluble metal sulfides (see also the enclosed solubility data) and silver halides. Miscellaneous examples of different type nanocomposites are also included.

To illustrate several unique features of our invention, the formation of copper-dendrimer internal complex and copper-containing dendritic nanocomposites are described first. As a typical representative, a generation four (EDA core) tris(hydroxymethyl)aminomethane-modified PAMAM dendrimer was used containing 192 primary aliphatic hydroxide groups as surface end groups (G4.T).

Example Group I

Preparation of Copper-containing Nanocomposites

In this collection of examples [Cu(CH$_3$COO)$_2$-PAMAM G4.T] complex is used to demonstrate the subsequent formation of copper nanocomposites.

Example Cu#1

Preparation of [Cu(CH$_3$COO)$_2$-PAMAM G4.T]

In a 125 ml volume Pyrex absorption vessel, 0.362 g (2.0×10$^{-5}$ mole) PAMAM G4.T dendrimer was dissolved in 40 ml deionized water. To this solution was added 0.123 g (6.19×10$^{-4}$ mole) Cu(CH$_3$COO)$_2$·X H$_2$O dissolved in 20 ml water. The light blue color of the Cu(CH$_3$COO)$_2$ solution instantaneously turned into deep blue indicating the formation of the copper-dendrimer complex. The reactor was purged with a slow stream of dry nitrogen for 10 min. to ensure the perfect mixing. During this time an internal copper complex of the dendrimer forms. This internal complex can be isolated in solid form as a deep blue compound.

Of Isolating the Copper Ion-dendrimer Complex:

The solution of internal complex was transferred into a 250 ml round bottom flask and the solvent was evaporated on a rotavap at 40° C. yielding a deep blue solid layer [Cu(CH$_3$COO)$_2$ G4.T] on the wall. In contrast to the inorganic copper salt this material readily dissolves in methanol with a deep blue color. Thus, using 5 ml of methanol as a solvent, the product was transferred into a glass vial and the solvent was evaporated by applying a gentle nitrogen stream by means of a Pasteur-pipet onto the surface of the solution. Further drying of the product under vacuo at room temperature yielded 0.479 g (98%) internal complex as a blue solid. Although on the reverse phase ion-pair HPLC chromatogram (RP-IP HPLC, see FIG. 5) a copper-peak can also be identified in addition to the peak of the composite, even though the solubility in organic solvents, the thermogravimetric analysis (TGA) thermograms and differential scanning calorimetry (DSC) curves are different from those of the starting materials.

Due to the very strong internal interactions between copper and the array of ligands in the interior of this dendrimer, only a partial separation of copper and copper-containing dendrimer can be achieved by dialysis because the dendrimer container will be highly favored by the copper ion. Table V illustrates the results of a set of exhaustive dialysis experiments using semi-permeable 10K membranes, in which 3 ml of G4.0 and G4.T PAMAM dendrimer solutions containing varying amounts of Cu$^{2+}$ were dialysed against 3×300 mL deionized water for 3×2 days.

TABLE V

Comparison of Cu$^{2+}$ Concentration Before and After Dialysis.

| Name | [Cu$^{2+}$] before dialysis (calcd.) | | [Cu$^{2+}$] after dialysis (found in the dendrimer) | | [Cu$^{2+}$] after dialysis (found outside of the dendrimer) | |
|---|---|---|---|---|---|---|
| | [mg/L] | 10$^3$ × M | [mg/L] | 10$^4$ × M | [mg/L] | 10$^5$ × M |
| Cu$^{2+}$-G4.T | 115 | 1.81 | 26 | 4.09 | 0.28 | 0.36 |
| Cu$^{2+}$-G4.T | 173 | 2.72 | 27 | 4.25 | 0.43 | 0.68 |
| Cu$^{2+}$-G4.T | 288 | 4.53 | 27 | 4.25 | 0.64 | 1.01 |
| Cu$^{2+}$-G4.T | 433 | 6.81 | 29 | 4.56 | 0.96 | 1.51 |
| Cu$^{2+}$-G4.T | 577 | 9.08 | 37 | 5.82 | 1.22 | 1.92 |
| Cu$^{2+}$-G4.0 | 115 | 1.81 | 11 | 1.73 | 0.22 | 0.35 |
| Cu$^{2+}$-G4.0 | 173 | 2.72 | 10 | 1.57 | 0.48 | 0.76 |
| Cu$^{2+}$-G4.0 | 288 | 4.53 | 13 | 2.04 | 0.71 | 1.12 |
| Cu$^{2+}$-G4.0 | 433 | 6.81 | 10 | 1.57 | 1.13 | 1.78 |
| Cu$^{2+}$-G4.0 | 577 | 9.08 | 12 | 1.89 | 1.23 | 1.93 |

(Sample volumes before experiment: 3 ml; after experiment: 3.5 ml in the case of G4.T, and 5.1 ml when G4.0 was used. Dendrimer concentrations are identical, it is 8.84 × 10$^{-5}$ M in each case, average Cu$^{2+}$ concentrations were measured by atomic absorption spectroscopy (AA)).

The results show that despite of the hundred-fold excess of the dialysing water, the concentration of copper ions is at least an order of magnitude higher inside of the dendrimers than outside. Concentrations of copper inside of the semipermeable membrane are practically identical regardless [Cu]$_0$, and the value of these final concentrations depend on the composition and architecture of the dendrimer used. However, as it is demonstrated by reversed phase ion-pair chromatography, this complex will display separate peaks for copper ions and the dendrimer, illustrating the temporary nature of the internal complex.

The above-described [Cu(CH$_3$COO)$_2$-PAMAM G4.T] internal complex was used to prepare different other copper-containing composites by subsequent chemical transformations to illustrate the synthesis of said novel nanocomposites with surprising properties.

Example Cu#2

Preparation of {Cu(OH)$_2$-PAMAM G4.T} Nanocomposite

[Cu(CH$_3$COO)$_2$-PAMAM G4.T] inorganic-dendrimer internal complex was prepared by mixing 1.0 ml of 1.0 mM solution (1.0×10$^{-6}$ mole) of G4.T and 3.1 ml of 10 mM aqueous Cu(CH$_3$COO)$_2$ solution (3.1×10$^{-5}$ mole). In the resulting solution the concentrations are: [Cu]=7.56×10$^{-6}$ M and [G4.T]=2.44×10$^{-7}$ M, the ligand/metal ion ratio is 4/1 and the metal ion/dendrimer molar ratio=31/1.

[Cu(CH$_3$COO$_2$-G4.T].

To this solution, a high excess (4 ml) of 0.1 M NaOH solution was added. The product solution retained its dark blue color without any precipitation.

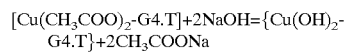

[Cu(CH$_3$COO)$_2$-G4.T]+2NaOH={Cu(OH)$_2$-G4.T}+2CH$_3$COONa

In contrast to this experiment, when the $Cu(CH_3COO)_2$ solution was used without encapsulation, a flaky greenish-blue precipitate, $Cu(OH)_2$ was observed, that subsequently turned into brown and then black as a consequence of the dehydration of the copper(II) hydroxide.

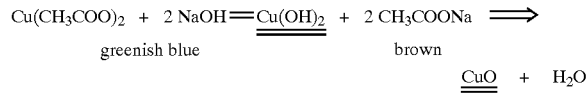

Example Cu#3

Preparation of {$Cu_2O$-G4.T} Nanocomposite

[$Cu(CH_3COO)_2$-PAMAM G4.T] inorganic-dendrimer internal complex was prepared by mixing 1.0 ml of 1.0 mM solution ($1.0 \times 10^{-6}$ mole) of G4.T and 3.1 ml of 10 mM aqueous $Cu(CH_3COO)_2$ solution ($3.1 \times 10^{-5}$ mole). In the resulting solution the concentrations are: $[Cu]=7.56 \times 10-6$ M and $[G4.T]=2.44 \times 10^{-7}$ M, the ligand/metal ion ratio is 4/1 and the metal ion/dendrimer molar ratio=31/1.

[$Cu(CH_3COO)_2$-G4.T].

To this solution 1 ml of 0.1 M NaOH solution was added. The product solution {$Cu(OH)_2$-G4.T} retained its dark blue color without any precipitation. To this solution 1 ml of 0.1 M ascorbic acid ($C_6H_8O_6$) solution was added. The solution turned green, then yellow, indicating the formation of the dendrimer encapsulated CuOH and $Cu_2O$, respectively, but no precipitation occurred.

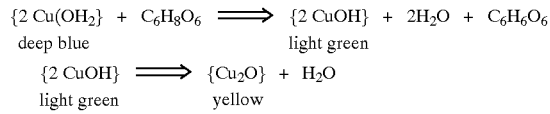

The scattered light of this solution displays the yellow color of the copper(I) oxide, while the solution remains transparent and light blue in front of a white light source because of the observation of the complementer color in transmitted light. Due to the small size of the copper(I) oxide particles dispersed in the dendrimer interior, the solution behaves as an optical filter.

Example Cu#4

Preparation of {CuS-PAMAM G4.T} Composite

[$Cu(CH_3COO)_2$-PAMAM G4.T] inorganic-dendrimer internal complex was prepared using the procedure described in Example Cu#1. Instead of isolating the copper ion-dendrimer complex, a slow stream of hydrogen sulfide was bubbled through the complex solution. The solution turned dark brown, but no macroscopic precipitation was observed.

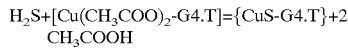

Addition of $H_2S$ was continued until the formation of a white precipitate (ZnS) was observed in the gas washing tower filled with 0.2 M solution of $Zn(CH_3COO)_2$ which was used as a decontaminator solution. Then the stream of $H_2S$ was stopped, and the reactor was immediately purged with nitrogen for 30 mins. to remove the excess of $H_2S$. The solution was transferred into a 250 ml round bottom flask and the solvent was evaporated on a rotavap at 40° C. yielding a dark brown solid layer {CuS-G4.T} on the wall. This material readily dissolves in water with a dark brown color. The product was scraped from the wall and the black solid was transferred into a glass vial. Further drying of the product under vacuo at room temperature yielded 0.49 g (97%) of the nanocomposite as a black solid.

Example Cu#5

Preparation of {$Cu_2S$-PAMAM G4.T} Composite

[$Cu(CH_3COO)_2$-PAMAM G4.T] inorganic-dendrimer internal complex was prepared using the procedure described in Example Cu#1. Instead of isolating the copper ion-dendrimer complex, a slow stream of hydrogen sulfide was bubbled through the solution. The solution turned dark brown, but no macroscopic precipitation was observed.

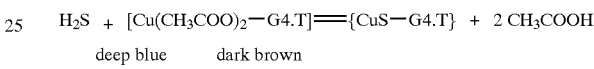

Addition of $H_2S$ was continued until the formation of a white precipitate (ZnS) was observed in the gas washing tower filled with 0.2 M solution of $Zn(CH_3COO)_2$ which was used as a decontaminator solution. Then the stream was stopped and the reactor was closed for overnight. After 16 hour reaction time, the reaction mixture turned to dark green indicating a redox reaction with the excess of hydrogen sulfide with the {CuS-G4.T} nanocomposite.

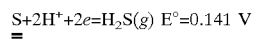

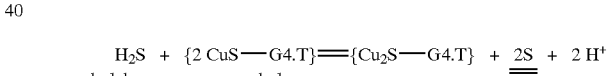

This second reaction does not take place without nanocomposite formation because CuS immediately precipitates from water due to its extremely low solubility, See Table I.

The reaction flask was purged with nitrogen to remove the residual $H_2S$ and then the sulphur was removed by a 0.45 microns Teflon syringe filter. The solution was transferred into a 250 ml round bottom flask and the solvent was evaporated on a rotavap at 40° C. yielding a dark green rigid layer of {$Cu_2S$-G4.T} on the wall. This material readily dissolves in water forming a dark green color solution. The product was scraped from the wall and the black solid was transferred into a glass vial. Further drying of the product under vacuo at room temperature yielded 0.49 g (97%) of the nanocomposite as a black solid.

Example Cu#6

Preparation of {Cu(0)-G5.P} Nanocomposite

[$Cu(CH_3COO)_2$-PAMAM G5.P] inorganic-dendrimer internal complex was prepared by mixing 1.0 ml of 1.0 mM methanol solution ($1.0 \times 10^{-6}$ mole) of G5.P and 3.1 ml of 10 mM aqueous $Cu(CH_3COO)_2$ solution ($3.1\times10^{-5}$ mole). In the resulting solution the concentrations are: $[Cu]=7.56\times10^{-6}$ M and $[G5.P]=2.44\times10^{-7}$ M, the ligand/metal ion ratio is 4/1 and the metal ion/dendrimer molar ratio=31/1.

$[Cu(CH_3COO)_2\text{-}G5.P]$.

To this solution 1 ml of 0.1 M ascorbic acid was added. The solution changed its color to green, then, after a short induction period, the solution displayed the characteristic color of metallic copper, indicating the total reduction of nanoencapsulated $Cu^{2+}$ first into $Cu^+$ and then $Cu(0)$, respectively.

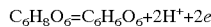

$C_6H_8O_6 = C_6H_6O_6 + 2H^+ + 2e$

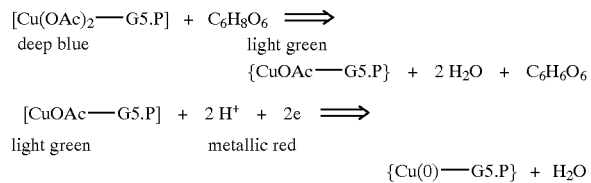

In scattered light, this solution displays the color of the metallic copper while it remains transparent in transmitted light because of the very small size of the copper particles dispersed in the dendrimer interior (Tyndall-effect).

Example Group II

Formation of Metal Sulfide Solutions in Water

A large number of examples can be used to demonstrate the principle of our invention by utilizing the well-known experiments of classical qualitative inorganic analysis. During the many years of development, these observations have placed into analytical classes. Hence, many reactions were defined as characteristic to particular metal ions. These reactions have easily observable features, such as intensive color change or formation of insoluble precipitates under certain conditions. In the first two classes of the classical qualitative inorganic analysis, reactions with sulfide ions are utilized. However, in the presence of dendritic polymers these reactions give surprising results.

General Description of Procedure A:

1) Internal Complex Formation:

Into a 14.8 ml screw-cap glass vial 1.0 ml of 1.0 mM ($1.0\times10^{-6}$ mole) aqueous solution of generation four (EDA core) tris-modified PAMAM dendrimer (G4.T) was added. (When it was necessary, the pH was adjusted between pH=3 and pH=6 with glacial acetic acid to prevent subsequent precipitation of the insoluble metal hydroxide before the formation of the internal complex). To this solution, 3.1 ml of 10 mM ($3.1\times10^{-5}$ mole) aqueous metal ion solution was added. Dry nitrogen gas was bubbled through the liquid to mix the two solutions and to remove air (removal of the air prevents unwanted oxidation that may occur during the consecutive steps). A typically 1 hour "rest period" was provided to reach the equilibrium state of the metal ion complexation. In this reaction mixture $[M]=7.56\times10^{-6}$ M and $[G4.T]=2.44\times10^{-7}$ M, the ligand/metal ion ratio is 4/1 and the metal-ion/dedrimer molar ratio=31/1.

2) Chemical Transformation:

In the next step, hydrogen sulfide gas was introduced in excess into the reaction mixture to react with the metal ions. Color changes indicated the formation of metal sulfides. The $H_2S$ was bubbled through for 30 sec., then the vial was capped and sealed with parafilm and left for overnight at room temperature. After the reaction was completed, the samples were sonicated for 30 min. and purged with nitrogen to remove the excess of $H_2S$. The samples were filtered through a 0.45 microns pore size Teflon syringe filter to remove any macroscopic precipitates. The samples were stored in solution at room temperature under nitrogen.

As a general observation, color changes may occur during mixing of the dendrimer and metal ion solution indicating complex formation. Metal ion solutions without dendrimers gave insoluble sulfides that precipitated quickly up addition of $H_2S$, while in the presence of dendritic hosts, colored but transparent solutions formed. The color change indicates metal sulfide formation, but no precipitation was observed in the presence of appropriately selected dendritic polymers.

General Description of Procedure B:

Same as Procedure A, except that 1.0 ml of 1.0 mM ($1.0\times10^{-6}$ mole) aqueous solution of generation four (EDA core) amine-terminated (G4.0) PAMAM dendrimer was added (see Table II). The pH was adjusted with glacial acetic acid to be between pH=3 and pH=6 to prevent subsequent precipitation of the metal hydroxide. To this solution, 4.7 ml of 10 mM ($4.7\times105$ mole) aqueous metal ion solution was added. In this reaction mixture, $[M]=8.25\times10^{-6}$ M and $[G4.T]=2.44\times10^{-7}$ M, the ligand/metal ion ratio is 4/1 and the metal-ion/dendrimer molar ratio=47/1. (M-G4.0).

When the dendrimers have complex forming ligands also as their surface groups, the $H_2S$ reaction gave colored and hazy solutions without any macroscopic precipitation. The haziness indicated that metal ions that had not been immobilized in the form of a nanocomposite coagulate when transformed into sulfides. These particles were removed from the solution by filtration, resulting in a clear solution of copper sulfide nanocomposite.

Example IIa

Preparation of $\{Cu_2S\}$ Composite Using Tris-modified PAMAMs From Generation 3 to Generation 7

Procedure A was used. Calculated amounts of 10 mM aqueous $Cu(CH_3COO)_2$ solution were added to various dendrimer solutions to keep the copper/ligand ratio equal to 4.

A one-hour "rest period" was provided.

Four Aqueous Solutions Were Prepared:
(a) 5 ml 10 mM $Cu(CH_3COO)_2$ solution,
(b) 5 ml 10 mM $Cu(CH_3COO)_2$ solution plus 2 ml cc. ammonium hydroxide (coordination provided by the $NH_3$), i.e., $[Cu(NH_3)_4]^{2+}$ was formed;
(c) 3.1 ml of 10 mM $Cu(CH_3COO)_2$ solution plus 1 ml of 1 mM G4.T (metal/dendrimer ratio=31/1 [Cu$(CH_3COO)_2$-G4.T];
(d) 4.7 ml of 10 mM $Cu(CH_3COO)_2$ solution plus 1 ml of 1 mM G4.0 (metal/dendrimer ratio=47/1) $\{Cu_2S\text{-}G4.0\}$.

Upon introduction of hydrogen sulfide into the reaction mixtures, the solutions changed from colorless to brown indicating the formation of CuS. Aqueous $Cu^{2+}$ solutions without dendrimers resulted in an insoluble black C*u*S which precipitated quickly. After 16 hour reaction time, the reaction mixtures turned to dark green indicating a redox reaction with the excess of hydrogen sulfide. {Cu$_2$S-G4.T} and {Cu$_2$S-G4.0} solutions were deep green but remained transparent. The samples were stored at room temperature and they proved to be stable for weeks.

Example IIb

Formation of Soluble CdS by Nanoencapsulation

Procedure A was used in conjunction with 3.1 ml of 10 mM ($3.1 \times 10^{-5}$ mole) aqueous Cd(CH$_3$COO)$_2$ solution. The pH of the solution was adjusted with glacial acetic acid between pH=3 and pH=6 to prevent hydroxide formation. A two-hour "rest period" was provided.

Four Aqueous Solutions Were Prepared:
- (a) 5 ml 10 mM Cd(CH$_3$COO)$_2$ solution,
- (b) 5 ml 10 mM Cd(CH$_3$COO)$_2$ solution plus 2 ml cc. ammonium hydroxide (NH$_3$ coordination) [Cd(NH$_3$)$_2$]$^{2+}$;
- (c) 3.1 ml of 10 mM Cd(CH$_3$COO)$_2$ solution plus 1 ml of 1 mM G4.T (metal/dendrimer ratio=31/1 [Cd(CH$_3$COO)$_2$-G4.T];
- (d) 4.7 ml of 10 mM Cd(CH$_3$COO)$_2$ solution plus 1 ml of 1 mM G4.0 (metal/dendrimer ratio=47/1) [Cd(CH$_3$COO)$_2$-G4.0].

Figure 8:
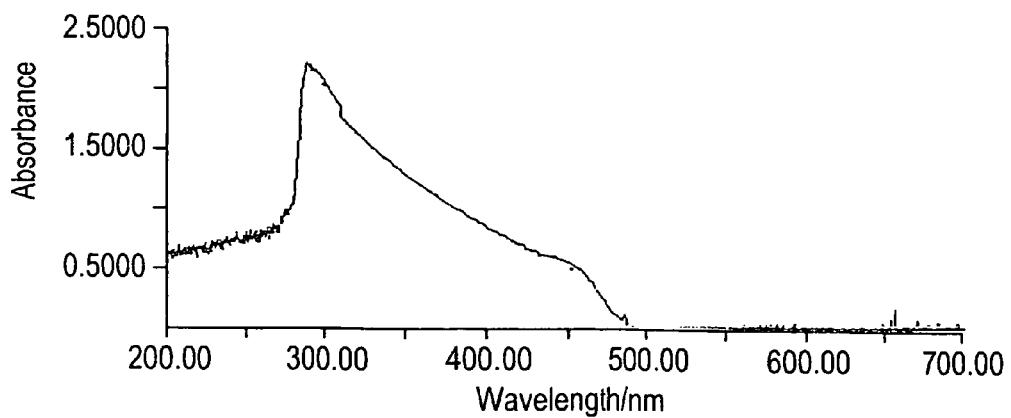
FIG. 8 is a UV-visible spectrum of dendrated CdS in a polypropylene cuvette.

Upon introduction of hydrogen sulfide into the reaction mixtures, the solutions changed from colorless to yellow indicating the formation of CdS. Aqueous Cd$^{2+}$ solutions without dendrimers resulted in an insoluble yellow C*d*S which precipitated quickly. {CdS-G4.T} and {CdS-G4.0} solutions were bright yellow but remained transparent (FIG. 8). The samples were stored at room temperature and they proved to be stable for weeks. Evaporation of a drop of this solution on a glass-slide resulted in a yellow, transparent and homogenous film, which can be redissolved either in water or in methanol.

Example IIc

Formation of Soluble PbS by Nanoencapsulation

Procedure A was used in conjunction with 3.1 ml of 10 mM ($3.1 \times 10^{-5}$ mole) aqueous Pb(CH$_3$COO)$_2$ solution. The pH of the solution was adjusted with glacial acetic acid between pH=3 and pH=6 to prevent hydroxide formation. A two-hour "rest period" was provided.

Four Aqueous Solutions Were Prepared:
- (a) 5 ml 10 mM Pb(CH$_3$COO)$_2$ solution,
- (b) 5 ml 10 mM Pb(CH$_3$COO)$_2$ solution plus 2 ml cc. ammonium hydroxide (NH$_3$ coordination) [Pb(NH$_3$)]$^{2+}$;
- (c) 3.1 ml of 10 mM Pb(CH$_3$COO)$_2$ solution plus 1 ml of 1 mM G4.T (metal/dendrimer ratio=31/1 [Pb(CH$_3$COO)$_2$-G4.T];
- (d) 4.7 ml of 10 mM Pb(CH$_3$COO)$_2$ solution plus 1 ml of 1 mM G4.0 (metal/dendrimer ratio=47/1) [Pb(CH$_3$COO)$_2$-G4.0].

Upon introduction of hydrogen sulfide into the reaction mixture, the color of the solutions changed from colorless to brownish-black indicating the formation of PbS. Aqueous Pb$^{2+}$ solutions without dendrimers resulted in insoluble black P*b*S which precipitated quickly. {PbS-G4.T} and {PbS-G4.0} solutions were brownish-black but remained transparent. The samples were stored at room temperature and they proved to be stable for several days.

Example IId

Formation of Soluble ZnS by Nanoencapsulation

Procedure A was used in conjunction with 3.1 ml of 10 mM ($3.1 \times 10^{-5}$ mole) aqueous Zn(CH$_3$COO)$_2$ solution. The pH of the solution was adjusted with glacial acetic acid to pH=6 to prevent hydroxide formation. A two-hour "rest period" was provided.

Four Aqueous Solutions Were Prepared:
- (a) 5 ml Zn(CH$_3$COO)$_2$ solution,
- (b) 5 ml Zn(CH$_3$COO)$_2$ solution plus 2 ml cc. ammonium hydroxide (NH$_3$ coordination) [Zn(NH$_3$)$_2$]$^{2+}$;
- (c) 3.1 ml of 10 mM Zn(CH$_3$COO)$_2$ solution plus 1 ml of 1 mM G4.T (metal/dendrimer ratio=31/1 [Zn(CH$_3$COO)$_2$-G4.T];
- (d) 4.7 ml of 10 mM Zn(CH$_3$COO)$_2$ solution plus 1 ml of 1 mM G4.0 (metal/dendrimer ratio=47/1) [Zn(CH$_3$COO)$_2$-G4.0].

In the next step, an excess of hydrogen sulfide gas was introduced into the reaction mixtures. White precipitate was observed in the Zn(CH$_3$COO)$_2$ and [Zn(NH$_3$)$_2$]$^{2+}$, solutions indicating the quick formation of Z*n*S. {Zn(CH$_3$COO)$_2$-G4.T} and {Zn(CH$_3$COO)$_2$-G4.0} turned to white and hazy but remained transparent. After 30 seconds bubbling, the tubes were capped and sealed with parafilm for storage overnight. The samples were sonicated for 30 min. and purged with nitrogen to remove the excess of H$_2$S. The samples were stored at room temperature and they proved to be stable. Evaporation of the solution on a glass-slide resulted in a colorless, transparent and homogenous film, which could be redissolved in methanol and DMSO.

Example IIe

Formation of Soluble CoS by Nanoencapsulation

Procedure A was used in conjunction with 3.1 ml of 10 mM ($3.1 \times 10^{-5}$ mole) aqueous Co(CH$_3$COO)$_2$ solution. The pH of the solution was adjusted with glacial acetic acid to pH=6 to prevent hydroxide formation. A two-hour "rest period" was provided to reach the equilibrium state for the metal ion complexation.

Four Solutions Were Prepared:
- (a) 5 ml Co(CH$_3$COO)$_2$ solution,
- (b) 5 ml Co(CH$_3$COO)$_2$ solution plus 2 ml cc. ammonium hydroxide (NH$_3$ coordination) [Co(CH$_3$COO)$_2$-NH$_3$];
- (c) 3.1 ml of 10 mM Co(CH$_3$COO)$_2$ solution plus 1 ml of 1 mM G4.T (metal/dendrimer ratio=31/1 [Co(CH$_3$COO)$_2$-G4.T];
- (d) 4.7 ml of 10 mM Co(CH$_3$COO)$_2$ solution plus 1 ml of 1 mM G4.0 (metal/dendrimer ratio=47/1) [Co(CH$_3$COO)$_2$-G4.0].

In the next step, an excess of hydrogen sulfide gas was introduced into the reaction mixtures. The color of the solutions changed from colorless to black indicating the formation of CoS.

Figure 9:
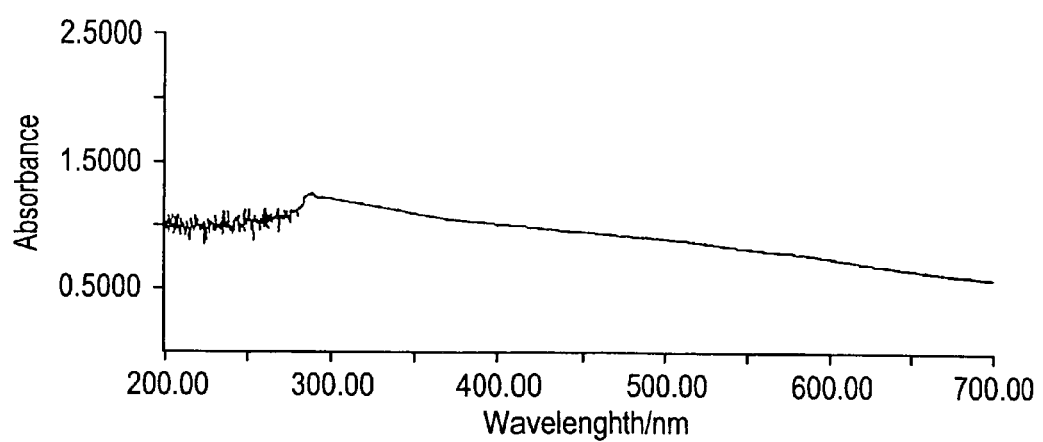
FIG. 9 is a UV-visible spectrum of CoS in water in a polypropylene cuvette.

Co$^{2+}$ solutions without dendrimers resulted in a small amount but heavy black C*o*S which precipitated quickly. [CoS-NH$_3$] gave a black precipitate and a light brown liquid phase, due to $(NH_4)_2S$ formation. {CoS-G4.T} and {CoS-G4.0} solutions were dark black but remained transparent. The samples were stored at room temperature and they proved to be stable for more than five days (FIG. 9).

Example IIf

Formation of Soluble FeS by Nanoencapsulation

Measured amount of aqueous $FeSO_4$ solution was mixed with a calculated amount of aqueous dendrimer solution in a 60 ml screw-cap test tube. The pH of the resulting solution was adjusted with glacial acetic acid between pH=3 and pH=6 to prevent hydroxide formation before diffusion. Dry nitrogen gas was bubbled through the liquid to remove the air and avoid the formation of sulfur by oxidation during consecutive steps. A two-hour "rest period" was provided to reach the equilibrium state for the metal ion complexation.

Four Solutions Were Prepared During the First Attempt:
(a) 5 ml of $FeSO_4$ solution;
(b) 5 ml of $FeSO_4$ solution plus 2 ml cc. ammonium hydroxide ($NH_3$ coordination) [$FeSO_4$-$NH_3$];
(c) 3.1 ml of 10 mM $FeSO_4$ solution plus 1 ml of 1 mM G4.T (metal/dendrimer ratio=31/1 [$FeSO_4$-G4.T];
(d) 4.7 ml of 10 mM $FeSO_4$ solution plus 1 ml of 1 mM G4.0 (metal/dendrimer ratio=47/1) [$FeSO_4$-G4.0].

In the next step, an excess of hydrogen sulfide gas was introduced into the reaction mixtures. The color of the solutions changed from very light green to black indicating the formation of FeS. Only a small amount of black solid precipitated from the $FeSO_4$ solution, but {FeS-G4.T} and {FeS-G4.0} were dark black. After 30 seconds bubbling, the tubes were capped and sealed with parafilm for overnight. The samples were sonicated for 30 min. and purged with nitrogen to remove the excess of $H_2S$. $Fe^{2+}$ solutions without dendrimers resulted in a small amount of heavy black FeS, which precipitated quickly. [$FeSO_4$-$NH_3$] gave a plenty of black precipitate due to $(NH_4)_2S$ formation. {$FeSO_4$-G4.T} and {$FeSO_4$-G4.0} solutions were dark black and separated within several hours, indicating that encapsulation did not occur and the reaction took place outside of the dendrimer. In the next step, similar samples were prepared, but with G5.T PAMAM. This experiment again led to the same unsuccessful capsulation as in the case of G4.T. However, when the "rest time" was lengthened to 12 hr., the diffusion into the interior did occur, and $H_2S$ addition resulted in nanocomposite formation. This transparent black solution was stored at room temperature and it proved to be stable.

Example IIg

Preparation of {$Ag_2S$-G4.T} Nanocomposite

{$Ag_2S$-G4.T} nanocomposite was made by the method described in Example Cu#5, except that 0.159 g ($6.19 \times 10^{-4}$ mole) silver trifluoromethanesufonate was used.

Evaporation of the solvent on a rotavap at 40° C. yielded a dark brown rigid layer {$Ag_2S$-G4.T} on the wall of the flask. This material readily dissolves in water with a dark brown color. The product was scraped from the wall and the black solid was transferred into a glass vial. Further drying of the product under vacuo at room temperature yielded 0.53 g (101%) nanocomposite as a black solid. Ag content was found to be 14.28% (theoretical: 12.8%) by atomic absorption (AA) analysis.

Example IIh

Preparation of {$Cu_2S$-PEI/PEOX G=1.0 Dendrigraft} Nanocomposite

Procedure A was applied, except that 10 mM aqueous solution of PEI/PEOX generation=1.0 dendrigraft (PEI=100, PEOX=100) was used as host in the same calculated (ligand/metal=4/1) ratio.

The experimental observation was that a deep blue copper complex formed in the first step. Upon subsequent $H_2S$ addition, the solution turns to deep brown, then changes its color to deep green indicating the formation of {CuS-PEI/PEOX} followed by the formation of {$Cu_2S$-PEI/PEOX} nanocomposite. (The {CuS} nanocomposite can be reduced into $Cu_2S$ by the excess of reductive $H_2S$ gas). This solution is stable for 24 hrs.

Example IIi

An Attempt to Prepare {$Cu_2S$-PEI/PEOX G=1.0 Dendrigraft} Nanocomposite

Procedure A was applied, except that 10 mM aqueous solution of PEI/PEOX generation=1.0 dendrigraft (PEI=20, PEOX=20) was used as host in the same calculated (ligand/metal=4/1) ratio.

The experimental observation was that a deep blue nitrogen-copper complex formed in the first step. Upon subsequent $H_2S$ addition, the solution turns to deep brown then deep green, indicating the formation of {CuS-PEI/PEOX} followed by the formation of {$Cu_2S$-PEI/PEOX} nanocomposite. The solution of {$Cu_2S$-PEI/PEOX} is unstable, decomposes and within 2 hrs. a macroscopic precipitate appears.

Example IIi

An Attempt to Prepare {$Cu_2S$-PEI} Nanocomposite

Procedure A was applied, except that 10 mM aqueous solution of linear polyethyleneimine (PEI, n=100) was used as host in the same calculated (polymer ligand/metal=4/1) ratio.

The experimental observation was that a deep blue nitrogen-copper complex formed in the first step, then the solution turned to hazy brown after subsequent $H_2S$ addition, indicating the precipitation of untrapped $Cu$S. (The uncomplexed $Cu$S cannot be transformed into $\overline{\overline{Cu_2S}}$ in solid state).

Example Group III

Preparation of AgOH, AgBr, AgCl, Silver and Gold Nanocomposites

Example IIIa

Preparation of Water Soluble Nanocomposites Containing Silver Halides and Silver Hydroxide.

Description of General Procedure:
10 mM solution of $CF_3SO_3Ag$ and 0.1 equivalent solution of NaCl, KBr and NaOH was prepared by appropriate dilution. 1 mM aqueous solutions of G4.T and G4.0 was used for nanoreactors.

Three Solutions Were Prepared:
(a) The metal ion solution ($Ag^+$);
(b) 3.1 ml of 10 mM $Ag^+$ solution plus 1 ml of 1 mM G4.T ($Ag^+$/dendrimer ratio=31/1) [$Ag^+$-G4.T];
(c) 4.7 ml of 10 mM $Ag^+$ solution plus 1 ml of 1 mM G4.0 ($Ag^+$/dendrimer ratio=47/1) [$Ag^+$-G4.0].

A measured amount of aqueous $CF_3SO_3Ag$ solution was mixed with a calculated amount of aqueous dendrimer solution in a 15 ml screw-cap test tube. A "rest period" was provided to reach the equilibrium state for the $Ag^+$ ion complexation.

Figure 10:
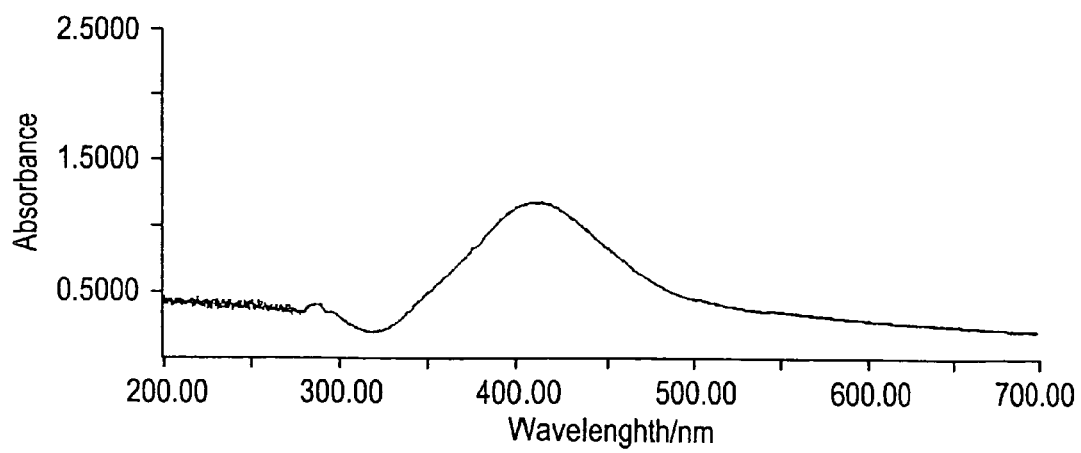
FIG. 10 is a UV-vis spectrum of {AgOH-G4.T} i.e., a dendrimer encapsulated AgOH.

In the next step, 0.5 ml of selected anion solution were added to the tube to react with the silver ions. Color change occurred indicating the formation of AgOH, AgCl and/or AgBr. The tube was capped, sealed with parafilm and stored in the dark. As a general experience, $CF_3SO_3Ag$ solution when reacted without dendrimers form instantaneously an insoluble precipitate that settles quickly. In contrast, in the presence of dendrimers the reaction yields transparent or slightly hazy solution (as in the case of AgCl and AgBr) suggesting subcolloidal particle formation. {Ag(0)-G4.T} and {Ag(0)-G4.0} were also filtered through a 0.45 microns Teflon filter to remove any macroscopic size precipitate originated from the complexation of metal ions on the dendrimer surface. (FIG. 10).

The samples were stored at room temperature in the dark. Solutions were found to be stable for hours before macroscopic precipitation began. Excess of ammonium hydroxide (which forms complex with any silver salt) caused instantaneous dissolution of the precipitate in the absence of the dendrimer. However, in the presence of encapsulated silver compounds the loss of color/haziness took several seconds. This observation can be explained by the hindered diffusion through the surface of the dendrimer that slows down the complexation process.

Example IIb

Preparation of {Ag(0)} Nanocomposite 10 mM solution of $CF_3SO_3Ag$ solution in water and methanol, and 0.1 M aqueous solution of L-ascorbic acid (AA) was prepared by appropriate dilution. As for dendritic polymers, 1 mM aqueous solutions of PAMAM G4.T, G5.P and G4.5 was used either in water or methanol.

Three Solutions Were Prepared:
(a) The metal ion solution ($Ag^+$);
(b) 3.1 ml of 10 mM $Ag^+$ solution plus 1 ml of 1 mM dendrimer solution ($Ag^+$/dendrimer ratio=31/1) [M-G4.T];
(c) 3 ml of 10 mM $Ag^+$ solution plus 1 ml of 10 mM ethylenediaminetetraacetic acid disodium salt [$Ag^+$-EDTA-$Na_2$].

A measured amount of $CF_3SO_3Ag$ solution was mixed with a calculated amount of aqueous dendrimer solution in a 15 ml screw-cap test tube. A 30 min. "rest period" was provided to reach the equilibrium state for the $Ag^+$ ion complexation.

In the next step, 0.5 ml of ascorbic acid (AA) solution was added to the tubes to react with the silver ions. In the cases of (a) and (c), brown precipitation was observed. This color indicated the formation of Ag(0) metal, which quickly settled.

When dendrimers were present, yellowish-brown, hazy but transparent solution formed that was stable for more than 24 hrs.

Example IIc

Preparation of {Au(0)} Nanocomposite

Aqueous solutions of $HAuCl_4$ (11.8 mM) and 0.1 M of L-ascorbic acid (AA) was prepared. As for dendritic polymers, 1 mM aqueous solutions of PAMAM G2.T, G4.T and G7.T were tried.

Three Solutions Were Prepared in a 15 ml Screw-cap Test Tube:
(a) The metal ion solution ($HAuCl_4$);
(b) 2 ml of 11.8 mM $HAuCl_4$ solution plus 1 ml of 1 mM dendrimer solution ($Au^+$/dendrimer ratio=23.6/1);
(c) 2 ml of 11.8 mM $HAuCl_4$ solutionplus 1 ml of 1 mM ethylenediamine-tertraacetic acid disodium salt.

A "rest period" was provided to reach the equilibrium state for the internal salt formation between nitrogens and the chloroaurate anion.

In the next step, 0.5 ml of ascorbic acid (AA) solution was added to the vials to reduce the aurate ions onto metallic gold. In the cases of (a) and (c) blue/black discoloration was observed. This color change indicated the formation of Ag(0) metal, which quickly settled in the form of a brownish solid.

When dendrimers were present, violet-blue and transparent solution formed that was stable for more than 24 hrs.

Example Group IV

Preparation of Methanolic Silver Bromide Solution 0.10 M solution of $CF_3SO_3Ag$ and saturated KBr (approx. 0.1 equivalent) were prepared in methanol by appropriate dilution. 27.63% methanolic solution of G=4.0 PAMAM was used for complexation.

A measured amount of $CF_3SO_3Ag$ solution was mixed with a calculated amount of dendrimer solution in a 15 ml screw-cap test tube. A "rest period" of 30 minutes was provided to reach the equilibrium state for $Ag^+$ ion complexation. Two solutions were prepared:
(a) The metal ion solution ($Ag^+$);
(b) 2.5 ml of 0.10 M $Ag^+$ solution plus 0.080 ml of 27.63% G4.0 ($Ag^{30}$/dendrimer ratio=25/1).

In the next step, 2 ml of methanolic KBr solution (100% excess to the $Ag^+$) was added by means of a pipette into the vial. Color change indicated the formation of AgBr. The tube was capped, sealed with parafilm and stored in the dark.

As a general experience, in the absence of a dendrimer, instantaneously an insoluble yellowish-white solid precipitated from the $CF_3SO_3Ag$ solution. This solid became black soon, as a result of photolysis of AgBr into Ag. In the presence of a dendrimer a transparent, hazy, white solution formed suggesting stable, subcolloidal particle formation.

Figure 11:
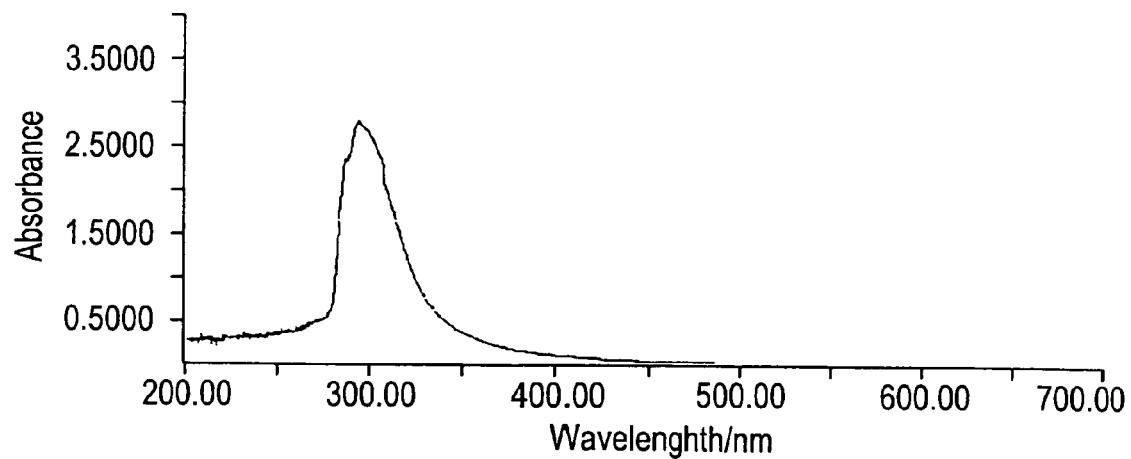
FIG. 11 is a UV-vis spectrum of the dendrimer encapsulated AgBr solution in MeOH stored in dark for 1 day, polypropylene cuvette.
Figure 12:
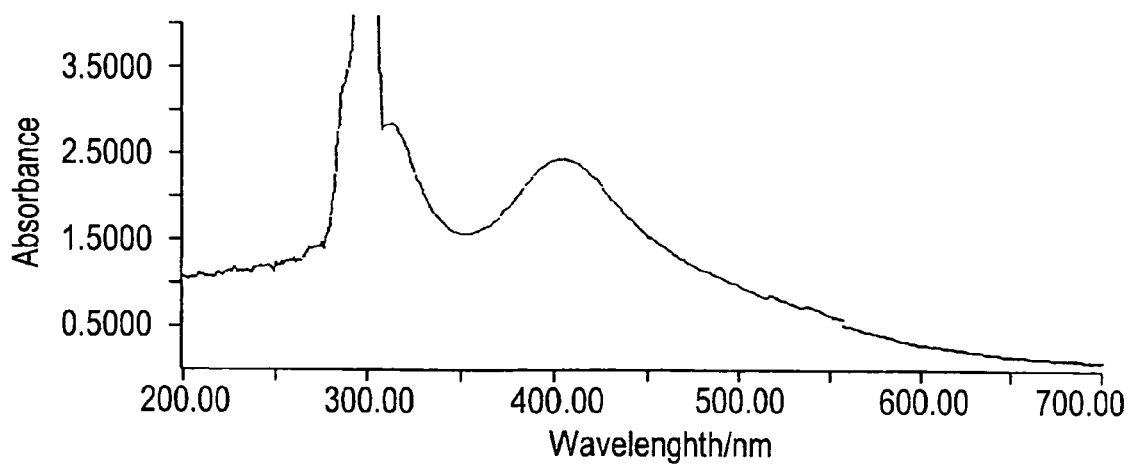
FIG. 12 is a UV-vis spectrum of AgBr solution in MeOH photolysed for 1 hr. in a polypropylene cuvette.

The {AgBr-G4.0} samples needed no filtration and existed for a prolonged time in the dark at room temperature. However, under sunlight the solution developed a light brown color. UV-visible spectra shows the appearance of a second peak at 405 nm in addition to the original 300 nm peak (FIG. 11 and FIG. 12).

Deliberately added excess of ammonium hydroxide (which forms complex with any silver salt) led to instantaneous dissolution of the precipitate in the absence of the dendrimer. However, in the case of nanoencapsulated silver compounds the loss of color took several seconds because diffusion through the surface of the dendrimer slows down the reaction.

Example Group V

Preparation of Metal Sulfide Solutions in Toluene

In a 20 ml screw-cap test tube, 5 ml of 10 mM aqueous $Cu^{2+}$-acetate solution was mixed with a 5 ml of 1.43 mM G=4.0 epoxydecane modified (ammonia core) PAMAM dendrimer solution in toluene. This dendrimer has a hydrophobic surface and is able to perform complexation only in its interior. The resulting heterophase solution was shaken for several minutes. Dark blue color of the organic phase was observed due to the complexation of copper ions within the dendrimer, which confirms transfer of the copper ions into the organic layer.

Figure 13:
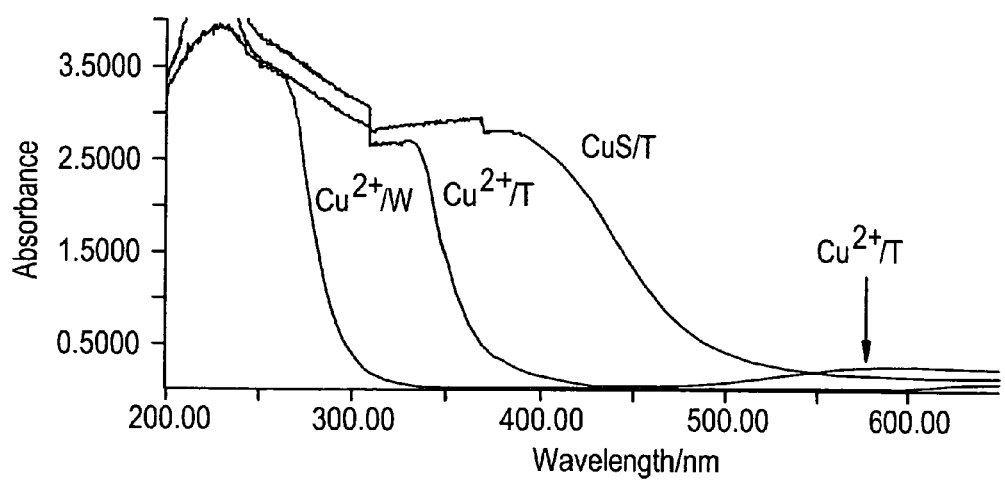
FIG. 13 is a comparison of UV-visible spectra of Cu$^{2+}$ in water (Cu$^{2+}$/W), the [Cu$^{2+}$-G4.T] in toluene (Cu$^{2+}$/T) and CuS in toluene (CuS/T).

The dark blue toluene layer was separated and, in the next step, an excess of hydrogen sulfide gas was introduced into the reaction mixture to react with the copper ions. The dark blue color turned into brownish-yellow because of the formation of {CuS}. This organic reaction mixture remained stable and transparent without any precipitate for several weeks in a closed vial. (FIG. 13).

Using aqueous solutions of $Ag^+$, $Cd^{2+}$, $Fe^{2+}$, $Ni^{2+}$ and $Mn^{2+}$ ions in the same experiment also led to sulfides solubilized in toluene.

Example Group VI

Comparison of Sulfide Nanocomposite Formation in Astramol and Perstorp Dendritic Hosts In this group of examples different guests were reacted within ASTRAMOL G=4 $(DAB(PA)_{64})$ and PERSTORP dendritic polyester (generation five) hosts using Procedure A. Observations after 48 hours of reaction time are summarized listed (on the next page) in Table VI.

Example Group VII

Preparation of Magnetic Dendritic Nanocomposites Using Aqueous Solutions of Zero Valence Metals In the following examples, dilute aqueous solutions of $FeCl_3$ and $CoCl_2$ were allowed to diffuse into different hosts and were reduced to zero valence metals within the dendrimers. In the absence of dendritic polymers, usually a black colloidal solution formed, which quickly precipitated as a black solid. However, in the presence of dendrimers, the same procedure resulted in black or dark brown, but transparent solutions. These solutions contained nanoencapsulated zero valence metals and displayed magnetic properties. A sample of these nanocomposite solutions were placed close to a permanent magnet and the effect of the magnetic field was observed. The magnet quickly collected the nanocomposite, and the homogenous black metal solution become heterogenous and displayed concentration gradient according to the magnetic field. In the absence of a magnetic treatment, the nanoencapsulated solution stayed stable and homogenous for a day.

Example VIIa $[FeCl_3\text{-}G6.T]$ inorganic-dendrimer internal complex was prepared by mixing 0.5 ml of 0.5 mM aqueous solution ($0.25\times10^{-6}$ mole) of G6.T PAMAM and 2.5 ml of 10 mM aqueous $FeCl_3$ solution ($2.5\times10^{-5}$ mole). In the next step, the pH was adjusted with 1–2 drops glacial acetic acid to prevent the precipitation of the $Fe(OH)_3$. (In the resulting deep yellow solution the concentrations are: $[Fe]=8.33\times10^{-5}$ M and $[G6.T]=8.33\times10^{-5}$ M). The vial was closed and the reaction mixture was allowed to stand for 12 hours at room temperature to give time for the diffusion of the $Fe^{3+}$ ions

TABLE VI

Comparison Of ASTRAMOL and PERSTORP Hosts.

| | ASTRAMOL Dendrimer | | | PERSTORP Dendritic Polyester | | |
|---|---|---|---|---|---|---|
| Metal Ion | Solution | Precipitate | Reaction Product | Solution | Precipitate | Reaction Product |
| $Cu^{2+}$ | Dark brown solution that turns to green | No | {Cu₂S} | Dark brown solution that stays brown | Some | {CuS} and Cu₂S |
| $Fe^{3+}$ | Dark green | Some Black | {FeS} and FeS | Colorless | Some yellow sulphur | Strong complexation |
| $Hg^{2+}$ | Dark brown which turns into orange | No | {HgS_br} to {HgS_t} | Clear, colorless (separated) | Black | HgS |
| $Bi^{3+}$ | Dark brown | No | {Bi₂S₃} | Dark brown | Some dark brown | {Bi₂S₃} and Bi₂S₃ |
| $Zn^{2+}$ | Yellowish, homogenous | No | {ZnS} | Clear, colorless (separated) | White | ZnS |
| $Cd^{2+}$ | Bright yellow | No | {CdS} | Bright yellow | No | {CdS} |
| $Co^{2+}$ | Black | Some | {CoS} and CoS | Clear, colorless (separated) | Black | CoS |
| $Pb^{2+}$ | Dark brown | No | {PbS} | Clear, colorless (separated) | Black | PbS |
| $Ag^+$ | Brown | No | {Ag₂S} | Clear, colorless (separated) | Dark brown | Ag₂S |
| $Ni^{2+}$ | Black | Some | {NiS} and NiS | Black | Some | {NiS} and NiS |
| $Mn^{2+}$ | Yellowish, clear | No | {MnS} | Clear, colorless (separated) | White, flaky | MnS |

Notation: {MeS} denotes a metal sulfide encapsulated in a nanocomposite. MeS indicates a macroscopic precipitation of the metal sulfide.

into the interior of the dendrimer. To this solution solid sodium borohydride was added in small portions while the vial was shaken. The solution foams due to the partial decomposition of the $NaBH_4$ and changes its color to black/dark grey. Finally, the solution displays the characteristic metallic grey color of the elemental iron. Although these metallic iron particles are very reactive due to their nanoscopic size, the solution is stable for a day under nitrogen, if magnetic field is not present. After a day, the metal dissolved again.

When the sample was placed into a magnetic field, the iron nanoparticles acquired permanent magnetization, and the nanocomposite travelled to the magnet followed by a subsequent formation of a black heterophase. Then, the vial was removed from the magnetic field and it was vigorously shaken for several seconds. As the consequence of the applied mechanical stress, the dark grey solution formed again. However, the residual magnetism of the iron nanoparticles reduced the lifetime of virtual homogeneity, and these samples gave rise to crystallite-like agglomerates similar to iron-filing.

Example VIIb

Same procedure was used as in Example VIIa, except that $CoCl_2$ was used. The experimental result is the same, but solution of {Co(0)-G6.T} is more stable than that of iron, and the nanocomposite exhibits lesser extent of residual magnetism. Using a lower generation dendrimer, such as PAMAM G5.OH, the internal complex forms much faster (in fifteen minutes).

Example VIIc

Same procedure was used as in Example VIIa, except that Ni(II)-acetate solution was used.

The experimental result is similar to Example VIIb, but {Ni(0)-G6.T} displays a low level of magnetism.

Example Group VIII

Miscellaneous Examples

In the following examples, dilute aqueous solutions of $Ca^{2+}$, $Gd^{2+}$, $Al^{3+}$, $UO_2^{2+}$ and $Co^{2+}$ were allowed to diffuse into PAMAM hosts and subsequently were chemically transformed into different compounds within the dendrimers. In the absence of dendritic polymers usually a macroscopic precipitate formed, which quickly precipitated. However, in the presence of dendrimers, the same procedure resulted in transparent nanocomposite solutions.

VIII/1: Solubilization of $Ca^{2+}$-oxalate in the Form of Nanocomposites Using Dendritic Polymers:

0.1 M aqueous solution of $CaCl_2$, oxalic acid and EDTA-$Na_2$ was prepared and used in this test. As for dendritic polymers, 1 mM aqueous solutions of PAMAM G4.T, ASTRAMOL G=4 and PERSTORP G=5 was used either in water or methanol. For comparison Five Solutions Were Prepared:
(a) 1 ml of metal ion solution ($Ca^{2+}$);
(b) To 1 ml of 1 mM dendritic polymer solution 0.3 ml of 0.1 M $Ca^{2+}$ solution was added ($Ca^{2+}$/dendrimer ratio=30/1);
(c) To 1.0 ml 0.1 M aqueous solution of $CaCl_2$ solution was added 1.0 ml of 0.1 M ethylenediaminetetraacetic acid disodium salt (EDTA-$Na_2$);
(d) To 1 ml of 1 mM dendritic polymer solution 0.3 ml of 0.1 M oxalic acid solution was added (oxalic acid/dendrimer ratio=30/1).

A measured amount of second reactant solution was mixed in a 15 ml screw-cap test tube with the solutions listed above after a 30 min. "rest period". This time was provided to reach the equilibrium state for the first reactant.

In the next step, equivalent amount of second reactant was added to the vials to react with the Reactant #1. (Oxalic acid solution was used in (a), (b), (c), and $Ca^{2+}$ solution was used in (d)).

In the case of (a), white crystals precipitated less than a minute. In the case of (c), white crystals precipitated within several minutes. Mechanical stress (shaking) did not restore the suspension.

When dendritic polymers were present, white, hazy but transparent solution formed that was stable for more than 5 hrs. Order of composite precipitation was: PAMAM<ASTRAMOL<PERSTORP. Vigorous shaking restored the milk-like appearance.

Example VIII/2

Preparation of $Gd^{2+}$-oxalate Nanocomposite Using a Dendritic Polymer $[Gd(CH_3COO)_2$-G4.T] internal complex was prepared by mixing 1.0 ml of 1.0 mM aqueous solution ($1 \times 10^{-5}$ mole) of G4.T PAMAM and 3.1 ml of 10 mM aqueous $Gd(CH_3COO)_2$ solution ($3.1 \times 10^{-4}$ mole). The vial was closed and the reaction mixture was allowed to stand for 0.5 hours at room temperature to give time for the diffusion of the $Gd^{2+}$ ions into the interior of the dendrimer. To this solution 2 ml of 10 mM oxalic acid solution was added. When dendritic polymer was present, the solution remained colorless and transparent but macroscopic, crystalline, white precipitate was observed in the absence of the polymer.

Example VIII/3

Preparation of $Al(OH)_3$ Nanocomposite Using a Dendritic Polymer $[Al_2(SO_4)_3$-G4.T] internal complex was prepared by mixing 1.0 ml of 1.0 mM aqueous solution ($1 \times 10^{-5}$ mole) of G4.T PAMAM and 1.5 ml of 10 mM aqueous $Al_2(SO_4)_3$ solution ($1.5 \times 10^{-4}$ mole). The vial was closed and the reaction mixture was allowed to stand for 0.5 hours at room temperature to give time for the diffusion of the $Al^{3+}$ ions into the interior of the dendrimer. To this solution 1.0 ml of 10 mM NaOH solution was added. When dendritic polymer was present, the solution remained colorless and transparent, but macroscopic, flaky, white $(Al(OH)_3$ precipitate was observed in the absence of the polymer.

Example VIII/5

Preparation of Uranyl Phosphate Nanocomposite Using a Dendritic Polymer

[Uranyl phosphate-G4.T] internal complex was prepared by mixing 1.0 ml of 1.0 mM aqueous solution ($1 \times 10^{-5}$ mole) of G4.T PAMAM and 3.0 ml of 10 mM aqueous $UO_2(CH_3COO)_2$ solution ($3.0 \times 10^{-4}$ mole). The vial was closed and the reaction mixture was allowed to stand for 1 hour at room temperature to give time for the diffusion of the uranyl ions into the interior of the dendrimer. To this solution 3.0 ml of 10 mM $Na_3PO_4$ solution was added. When dendritic polymer was present, the solution turned to yellow but remained transparent. In the absence of the polymer, a macroscopic, flaky, yellow uranyl phosphate precipitate was observed.

Example VIII/6

Preparation of Cobalt(II) Hydroxide Nanocomposite Using a Dendritic Polymer

[$CoCl_2$-G4.T] internal complex was prepared by mixing 1.0 ml of 1.0 mM aqueous solution ($1 \times 10^{-5}$ mole) of G4.T PAMAM and 3.1 ml of 10 mM aqueous $CoCl_2$ solution ($3.1 \times 10^{-4}$ mole). The vial was closed and the reaction mixture was allowed to stand for 0.5 hours at room temperature to give time for the diffusion of the $Co^{2+}$ ions into the interior of the dendrimer. To this solution 50 microliter of 35% hydrazine solution was added. When dendritic polymer was present, the solution turned to yellow but remained transparent. In the absence of the polymer, a macroscopic, flaky, green cobalt(II) hydroxide precipitated promptly.

Example IX/1

Formation of Gold Nanoparticles in the Presence of Dendrimers

A) Using PAMAM dendrimer with aliphatic OH surface groups

Figure 14:
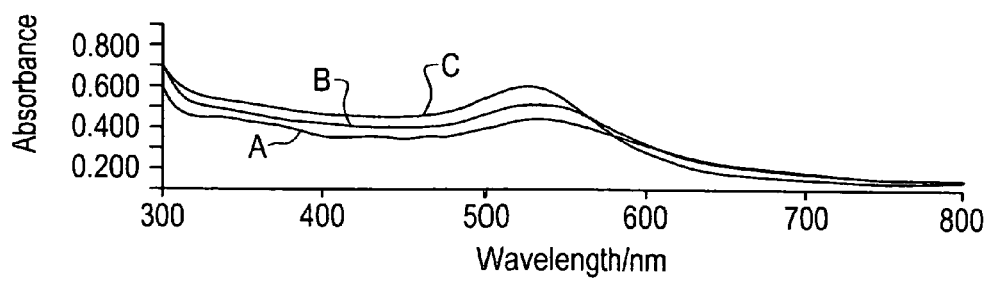
FIG. 14 is a graph of the absorbance of gold nanocolloides formed in the presence of a G4.T PAMAM dendrimer in water. [Au(0)]=33 mg/L.

Aqueous solutions of $HAuCl_4$ (10.4 mM) and 1.0 mM of PAMAM G4.T were prepared. To 3 ml of distilled water 50 µl of this G4.T solution was added and then mixed with 50 µl of $HAuCl_4$. The solution within minutes develops an intensive red color due to the formation of colloidal gold nanoparticles. UV-visible spectra for slightly different preparation methods indicate a peak within 530 and 550 nm (FIG. 14), that suggest a size of ~50 Å for these particles (M.Möller et al., Chem. Eur. J. 1966, 2(12, 1552). The development of the color can be accelerated by using 10 µl of 3% hydrazine solution to reduce the otherwise spontaneously decomposing $Au(OH)_3$ which precipitated in the interior of the G4.T dendrimer into elemental gold.

B) Using a PAMAM Dendrimer with Amino Surface Groups

Aqueous solutions of $HAuCl_4$ (10.4 mM) and 1.0 mM of PAMAM G4.0 were prepared.

Figure 16:
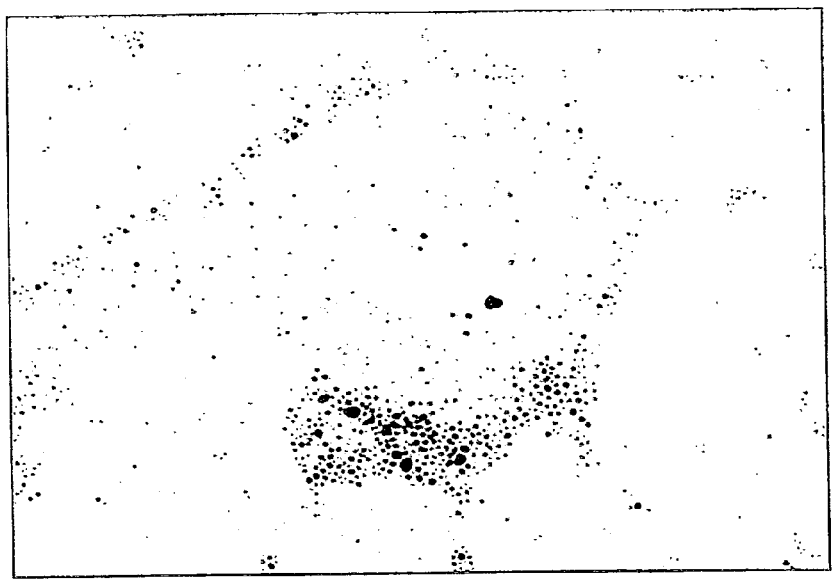
FIG. 16 is an electron micrograph of colloidal gold.

To 100 µl of $HAuCl_4$ stock solution ($5.02 \times 10^{-7}$ mole) that was diluted to 2.0 ml was added 250 µl of G5.0 solution ($2.17 \times 10^{6}$ m) followed by 0.25 ml of 3% hydrazine solution at room temperature. TEM micrograph shows that under these conditions the decomposition of tetrachloroaurate takes place on the surface of the macromolecule. This procedure results in dendrimer clusters with 50–60 nm diameter that are made of individual dendrimers covered and connected by elemental gold (FIG. 16).

Figure 17:
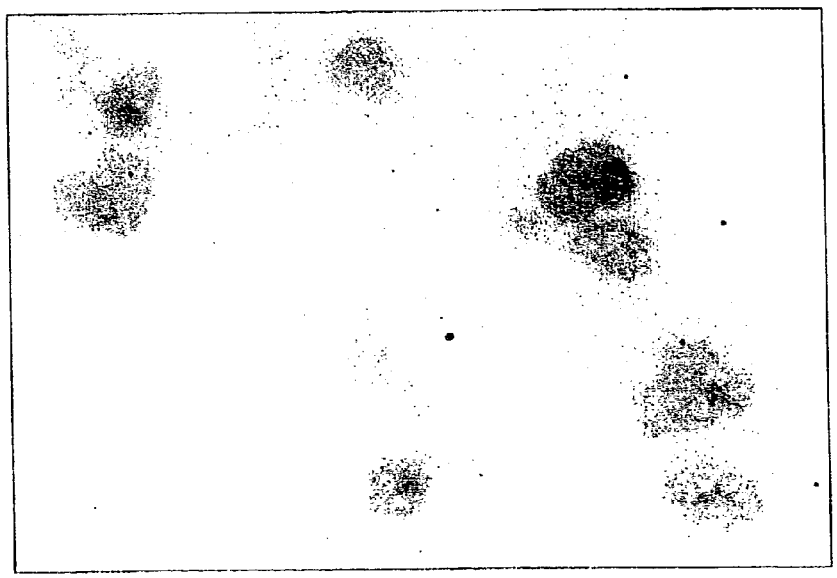
FIG. 17 is an electron micrograph of colloidal gold.
Figure 18:
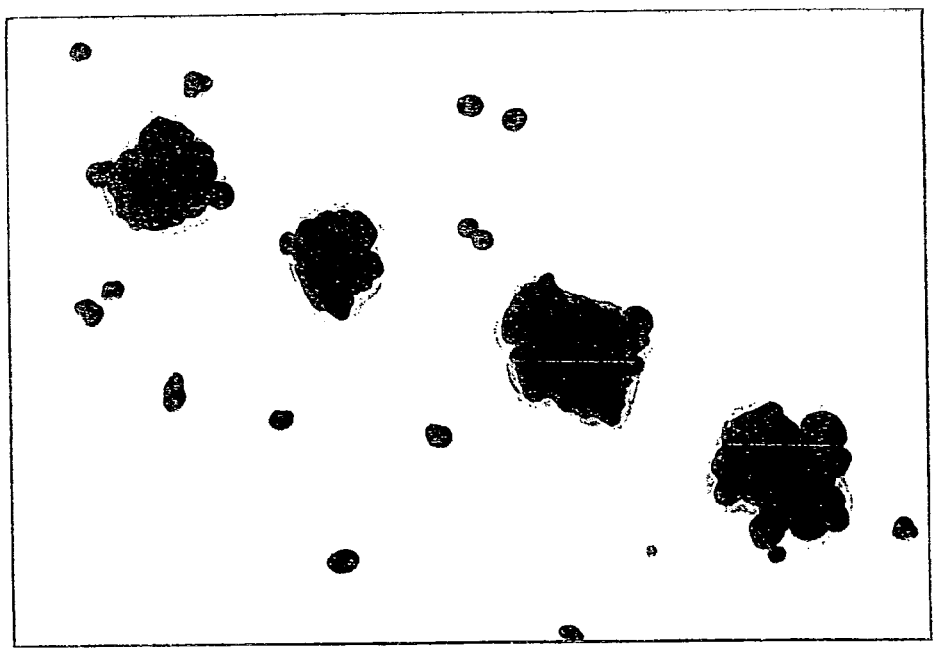
FIG. 18 is an electron micrograph of colloidal gold, brominated.

When the order of mixing was changed and the hydrazine solution was added to the dendrimer solution before the tetrachloroaurate, a fast reduction occurs, and non-clustered particles were formed. Their diameter appears to be identical to the dendrimer molecules (FIG. 17). Treatment of the red gold colloid solution with elemental bromine results in the formation of multiclusters, with an average diameter of 100 nm. This is an excellent example how to control the size of the gold particles by changing the addition order of chemicals or the chemicals themselves. (FIG. 18).

Example IX/2

Generation Dependence of CuS and $Cu_2S$ Nanocomposite Formation (Illustration of Scaffolding Properties of Generations with High Surface Densities)

In this series of TEM experiments, EDA-core PAMAM dendrimers with amino surface (Gn.0) were utilized to demonstrate the pattern-change in making CuS and $Cu_2S$ nanocomposites when different generations are used. The gradual decrease of the distance between surface groups is the reason for this change, and, as a consequence, the decrease in penetrability. As the size of the copper-hexaaqua-complex is constant, below G=7 copper is able to enter the interior of the dendrimer, and precipitates within the interior when sulfide ions are added. This pattern leads to black dots or shapes (clusters, etc.) formed from dark spots on the unstained TEM micrograph, because of the high electron adsorption of the metal.

This pattern changes to regular arrays of white spots in an arrangement similar to hexagonal closed packing surrounded with dark areas when PAMAMs of G=7 or higher are used. The reason is that in those cases, when the copper-hexaaqua-complex is unable to penetrate the surface, upon reaction with sulfide ions it turns into a insoluble sulfide on the surface. The copper sulfide then interconnects several dendrimer molecules forming berry-like structures that preferably self assemble into chains.

Figure 19:
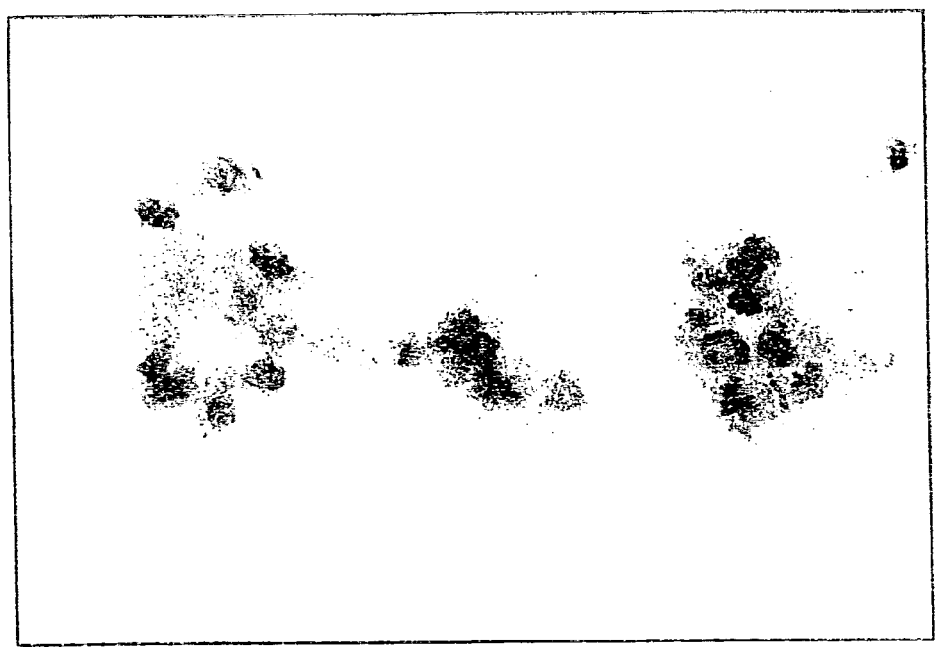
FIG. 19 is an electron micrograph of colloidal copper.
Figure 20:
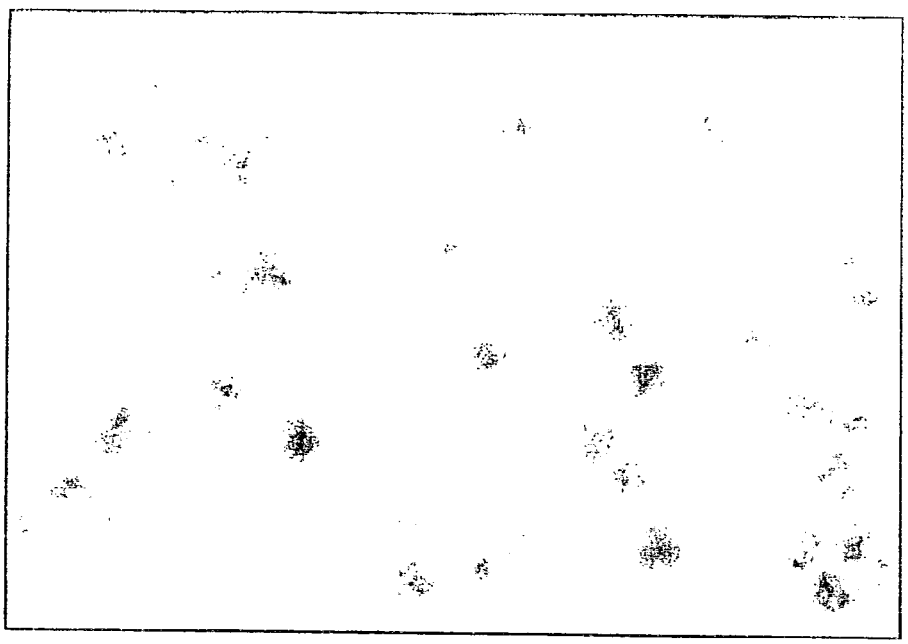
FIG. 20 is an electron micrograph of {CuS-G7.0} dendritic nanocomposite.
Figure 21:
FIG. 21 is an electron micrograph of {CuS-G9.0} dendritic nanocomposite.

As a general procedure, EDA-core PAMAM dendrimers with amino surface were dissolved in a dilute solution (1–2 mg/ml), and a calculated amount of copper acetate solution was added. (Concentration of copper was identical to the concentration of nitrogen in the dendrimer.) The solution was mixed by bubbling nitrogen gas through the solution. After a certain time (30 minutes –2 hr) $H_2S$ gas was introduced into the solution in excess. The solution was again flushed with $N_2$ and analyzed by TEM. The procedure resulted in dark brown solutions of soluble CuS nanocomposites that changes slowly into dark green ({Cu2S}). (FIGS. 19–21).

Example IX/3

Crosslinking of PAMAMA G4.0 with Terephtaldicarboxaldehyde (TPTDCA)

Difunctional monomers are especially useful in linking dendritic polymers. Examples are methacroyl chloride, acroyl chloride, methacroyl anhydride, acroyl anhydride, diepoxides, glycidylmethacrylate, 1,6-diisocyanato-hexane, ethyleneglycol dimethacrylate, 1,8diepoxyoctane, ethyleneglycoldiglycidyl-ether, epichlorohydrin, terephtaldicarboxaldehyde, etc.

1.715 g TPTDCA ($128 \times 10^{-4}$ m) was dissolved in 65 ml of methanol at room temperature. To this solution 7.79 g MeOH solution of PAMAM G4.0 (1.421 g, $1.0 \times 10^{-4}$ m) was added dropwise at room temperature. In 15 minutes, a white, milky solution formed. This solution was transferred into a refrigerator and was kept at $-5°$ C. It is stable at this temperature. During dialysis, or when it is exposed to air, a white gel forms. (In the first step, a soluble Schiff-base is formed). This gel slowly loses methanol, and can be dried into a tough, rubbery material, a crosslinked dendrimer. This crosslinking may be carried out both in the absence and in the presence of metal ions.

Transformation of a TPTDCA Crosslinked G4.0 Dendrimer into a Copper-sulfide Nanocomposite Crosslinked solid gel particles were placed into a 10 mM Cu(II)-acetate solution overnight. The yellowish dry gel turned into dark green, indicating the binding of copper ions to the nitrogen ligands in the dendritic domains of the gel. Exposure of this $Cu^{2+}$ into CuS. Because $Cu^{2+}$ do not diffuse in solid phase and copper ions bind only to the ligands, distribution of the incorporated CuS must be identical to the distribution of the dendrimers in the solid material. Thus, the distribution of CuS is created, determined and controlled by the G4.0 PAMAM dendrimer.

Example IX/4

Crosslinking of a Metal Ion Containing Dendrimer into a Metal-dendrimer Nanocomposite To a 1 ml methanolic solution of an EDA-core G5.0 PAMAM (25.05%, 250 mg, $8.67 \times 10^{-5}$ mole) was added 0.86 ml of 0.1 M methanolic $CoCl_2$ solution (20.64 mg, $8.67 \times 10^{-5}$ mole). After five minutes, 74.4 mg ($1.162 \times 10^{-3}$ mole) TFTDCA was added in a 10% methanolic solution followed by 100 mg of $NaBH_4$. While crosslinking by TFTDCA (formation of Schiff-base) at room temperature requires 10–15 seconds, addition of a NaBH4 not only provides stable $—NH—CH_2—Ph—CH_2—NH—$ linkages between dendrimers, but reduces the coordinated Co salt into a magnetic $Co_4B$ compound. Final appearance of the product is a black gel, that can be dried under nitrogen into a black solid.

Example IX/5

Preparation of a Metal-dendrimer Nanocomposite in a Silicate Matrix 0.270 g G4.T dendrimer and 0.045 g copper (II) acetate were dissolved in 2.0 ml of water giving a dark blue solution of the $[(CuAc_2)_{15}$-G4.T] internal complex. To this solution, 5 ml of tetraethylorthosilicate (Aldrich) and 4 ml of ethanol was mixed, and the mixture was poured into a Petri-dish. After two days, the solution has separated into a colorless upper phase and a solid, dark blue lower phase. The upper phase was decanted, and the lower phase was dried at room temperature resulting in 0.45 g hard, deep blue solid, a silicate matrix containing the $[(CuAc_2)_{15}$-G4.T] internal complex. Further heating of this modified silicate (0.16 g) at 180° C. for two days, brought about the decomposition of the PAMAM (decomposition temperature is 110–130° C.) and provided a hard, dark brown Cu-oxide nanocomposite in the silicate matrix. 0.17 g of the same modified silicate matrix, $SiO_4\{[(CuAc_2)_{15}$-G4.T]\}$, was treated with $H_2S$ in a closed vial, and gave 0.18 g $SiO_4\{[(CuS)_{15}$-G4.T]\}$ nanocomposite in the form of a dark brown solid.

Note: Surface-functionalities are available for further transformations even when they are in use as ligands. Due to its higher stability, a covalent bond can form also with those ligands that are actively binding to a metal or metalloid, see, e.g., reaction of $[(CuAc_2)_{31}$-G4.0] with 1,2-epoxyhexane.

Example IV/6

Surface Modification of a Copper(II) Internal Complex $[(CuAc_2)_{31}$-G4.0]

To a 1 ml methanolic solution of 56.8 mg EDA-core G4.0 PAMAM ($4.0 \times 10^{-6}$ mole) was added 37.5 mg ($2.56 \times 10^{-4}$ mole) copper(II) acetate. When all the inorganic compound dissolved 1 ml of 1,2-epoxyhexane was added (equivalent amount: 30.85 µl) and it was reacted for 64 hours. The color of the solution turned to greyish-blue. Removal of solvent on a rotavap gave 0.141 g blue solid in the form of a film, that was insoluble in methylenechloride, chloroform, toluene, and water, but it is soluble in methanol. This intermediate product is a spherical dendrimer surrounded with n-alkene chains $[(CuAc_2)_{31}$-G4.NHCHCH(OH)$C_4H_{10}$], containing complex copper ions in its interior. 0.070 g of this material was dissolved in 2.5 ml methanol and 10 ml of 30% hydrazine solution was added. Addition of the reducing agent instantaneously reduces the copper and results in a light brown solution that turns to red in five minutes. The appearance of the dispersion peak on the UV-spectrum shown in FIG. 15 and its position suggest Cu(0) particles of 50 Å size that corresponds to the size of the inverted dendritic covalent micelle (PAMAM G4.0 molecule with covalently attached hexyl chains).

Example IV/7

Synthesis and Modification of a PAMAM-methacrylate Resin (G2(OH)-MMA) into a Nanocomposite Film From 13.8 g 36.3% methanolic solution of a EDA-core PAMAM G=2 with an ethanolamine surface (G2(OH), Mw=4352) the solvent was evaporated on a rotavap and by storing the resulting viscous solid material under vacuum for three days. G2(OH) was dissolved in 50 ml of DMF and transferred into a 500 ml three-neck round-bottom flask equipped with a dropping funnel, $N_2$ line and mechanical stirrer. After cooling to 0° C., 6.0 ml triethylamine (43 mmole) was added and 3.5 ml methylmethacroyl chloride (90% 34.8 mmole) diluted with 5 ml DMF was added dropwise. The mixture was stirred overnight, then it was diluted with 200 ml water and extracted with $CH_2Cl_2$. After the first dilution with water, a yellow precipitate was floating in between the phases, which was filtered off before extraction and was found to be a crosslinked PAMAM. Drying gave 3.49 g yellow polymer, while extraction with methylenechloride yielded 0.69 g monomeric acrylated PAMAM dendrimer in the form of a viscous liquid that was stored in the freezer.

A fraction of this yellow polymer was immersed into a saturated methanolic solution of Cu(II) acetate. Within fives minutes, the resin turned into a very dark blue material indicating the diffusion and strong complexation of Cu-ions in the PAMAM matrix. Storing the modified matrix under $H_2S$ gas results in a black CuS nanocomposite.

Example IX/8

Synthesis and Modification of a Perstorp Polyester-methacrylate Resin (PS-G4)-MMA) into a CuS Containing Nanocomposite Matrix or Film (The applied procedure is a modification of the synthesis described by M. Johannson, A. Hult in the *J. of Coatings Technology* 67, No. 849, October. 1995, p. 36.)

5.01 g (6.84×10$^{-4}$ mole) generation four Perstorp polyester was placed into a 100 ml round bottom flask and melted by a heat-gun. The resulting melt was dissolved in 25 ml methanol, then stripped from the solvent and dried. 9.75 ml triethylamine and the polyester were dissolved in 35 ml THF and cooled to 0° C. on an ice-bath. 6.0 ml of methylmethacroyl chloride was diluted with 20 ml of THF and added dropwise while maintaining the temperature. The temperature was raised overnight and the solvent was evaporated on a rotavap. The residue was redissolved in 50 ml methylenechloride and it was washed with water, Na$_2$CO$_3$ solution and water again. Dried overnight over anhydrous sodium sulfate. The resulting material contains 65% methacrylate esters on stoichiometrically substitutable aliphatic OH groups (36–38 MMA/molecule). It is stable when kept in a dilute CH$_2$Cl$_2$ solution. Removal of solvent causes immediate polymerization, and the honey-like liquid gels quickly. It was partially redissolved in methylenechloride thus separating the still soluble monomeric form from the already crosslinked material that was filtered and dried on air.

The polymer gave 3.56 g light brownish solid. Color of this solid changes into greyish-blue (Cu-complex in the matrix) when immersed into a saturated a methanolic solution of Cu(II) acetate. This Cu-complex containing matrix can be transformed into a dark brown, CuS containing nanocomposite by treating the modified matrix with H$_2$S.

Solution of the soluble monomeric form in methylenechloride is perfectly miscible with 0.1 M methanolic solutions of Ni$^{2+}$, Cu$^{2+}$, Fe$^{3+}$, and Co$^{2+}$ ions. From these solutions, films can be cast on glass slides, containing reactive Ni$^{2+}$, Cu$^{2+}$, Fe$^{3+}$, and Co$^{2+}$ ions that can also be further reacted into nanocomposites.

Example IX/9

Crosslinking of a G4.0 PAMAM Dendrimer with Methacroyl Chloride and its Modification into a CuS Containing Nanocomposite 5.06 g EDA-core generation four amino surface PAMAM (G4.0, 3.56×10−4 mole) is dissolved in 45 ml anhydrous DMF and 25 ml pyridine. This solution was cooled to 0° C. and 3.0 ml methylmethacroyl chloride (diluted with 10 ml DMF) was added in fives minutes. In additional 30 minutes, a transparent, orange-colored gel formed on the wall of the flask as the main reaction product. It is not soluble in MeOH but swells and forms a soft gel. A piece of this polymer was placed into 0.1 molar aqueous Cu(II) acetate solution. It quickly turns dark blue indicating the complexation of Cu$^{2+}$ ions with the PAMAM molecules. Treatment of the dry blue resin with H$_2$S quickly changes the color to dark brown because of the formation of the CuS nanocomposite.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A method of immobilizing a compound which is substantially insoluble in a solvent in a soluble molecular scaffold, comprising contacting a solution of reactants with a dendritic polymer to form a dendritic polymer complex, and subsequently contacting the dendritic polymer complex with a reagent which reacts with the complex compound to form a solvent dispersible complex.

2. The method of claim 1, wherein the reactant solution is a solution metal containing an acetate.

3. The method of claim 2, wherein the metal of the metal acetate is cadmium, copper, zinc, lead, bismuth or manganese.

4. The method of claim 1, wherein the reactant solution is a solution containing a metal sulfate.

5. The method of claim 4, wherein the metal ion of the metal sulfate solution is iron.

6. The method of claim 1, wherein the reactant solution is a solution containing a metal trifluorosulfonate solution.

7. The method of claim 6, wherein the metal ion of the metal trifluorosulfonate solution is silver.

8. The method of claim 1, wherein the reagent which is reacted with the metal-dendritic polymer complex is hydrogen sulfide gas, and the solvent dispersible complex is a metal sulfide-dendritic polymer complex.

9. The method of claim 1, wherein the reagent which reacts with the metal-dendritic polymer complex is a halide ion, and the solvent dispersible complex is a metal halide/dendritic polymer complex.

10. The method of claim 1, wherein the reagent which reacts with the metal-dendritic polymer complex is a hydroxyl ion, and the solvent dispersible complex is a metal hydroxide/dendritic polymer complex.

11. The method of claim 1, wherein the dendritic polymer is a dendrimer.

12. The method of claim 1, wherein the dendritic polymer is a dense star poly(amidoamine) dendrimer.

13. The method of claim 1, wherein the dendritic polymer is at least a fourth generation polyamidoamine dendrimer.

14. The method of claim 2, wherein the polyamidoamine dendrimer is modified to provide a hydrophobic surface which facilitates solubility of the solvent-dispersible complex in a non-polar solvent.

15. The method of claim 3, wherein the dendrimer is surface modified by reaction with 1,2-epoxyalkane to provide a hydrophobic surface which facilitates solubility of the solvent dispersible complex in a non-polar solvent.

* * * * *